US011754447B2

(12) United States Patent
de Wit

(10) Patent No.: US 11,754,447 B2
(45) Date of Patent: Sep. 12, 2023

(54) ON-BOARD RADIATION SENSING APPARATUS

(71) Applicant: Calumino Pty Ltd., Eveleigh (AU)

(72) Inventor: Gabrielle de Wit, Pymble (AU)

(73) Assignee: Calumino Pty Ltd., Eveleigh (AU)

( * ) Notice: Subject to any disclaimer, the term of this patent is extended or adjusted under 35 U.S.C. 154(b) by 0 days.

(21) Appl. No.: 17/874,845

(22) Filed: Jul. 27, 2022

(65) Prior Publication Data

US 2022/0364932 A1    Nov. 17, 2022

Related U.S. Application Data

(63) Continuation of application No. 17/154,994, filed on Jan. 21, 2021, now Pat. No. 11,408,773, which is a
(Continued)

(51) Int. Cl.
*G01J 5/20* (2006.01)
*G01J 5/02* (2022.01)
(Continued)

(52) U.S. Cl.
CPC ............... *G01J 5/20* (2013.01); *G01J 1/0414* (2013.01); *G01J 1/44* (2013.01); *G01J 5/0225* (2013.01);
(Continued)

(58) Field of Classification Search
CPC .... G01J 5/20; G01J 1/0414; G01J 1/44; G01J 5/0225; G01J 5/40; G01J 2005/0077;
(Continued)

(56) References Cited

U.S. PATENT DOCUMENTS 5,929,440 A    7/1999 Fisher
6,080,988 A    6/2000 Ishizuya et al.
(Continued)

FOREIGN PATENT DOCUMENTS

JP    2000241240    9/2000
JP    2006134715    5/2006
(Continued)

OTHER PUBLICATIONS

On-Board Radiation Sensing Apparatus, U.S. Appl. No. 16/400,780, filed May 1, 2019, Gabrielle de Wit, Patented Case, Jun. 2, 2020.
(Continued)

*Primary Examiner* — Kiho Kim
(74) *Attorney, Agent, or Firm* — Greenberg Traurig

(57) ABSTRACT

Systems, methods, and apparatuses for providing on-board electromagnetic radiation sensing using beam splitting in a radiation sensing apparatus. The radiation sensing apparatuses can include a micro-mirror chip including a plurality of light reflecting surfaces. The apparatuses can also include an image sensor including an imaging surface. The apparatuses can also include a beamsplitter unit located between the micro-mirror chip and the image sensor. The beamsplitter unit can include a beamsplitter that includes a partially-reflective surface that is oblique to the imaging surface and the micro-mirror chip. The apparatuses can also include an enclosure configured to enclose at least the beamsplitter and a light source. With the apparatuses, the light source can be attached to a printed circuit board (PCB). Also, the enclosure can include an inner surface that has an angled reflective surface that is configured to reflect light from the light source in a direction towards the beamsplitter.

20 Claims, 12 Drawing Sheets

Related U.S. Application Data continuation of application No. 16/400,780, filed on May 1, 2019, now Pat. No. 10,900,842.

(60) Provisional application No. 62/791,193, filed on Jan. 11, 2019, provisional application No. 62/791,195, filed on Jan. 11, 2019, provisional application No. 62/791,479, filed on Jan. 11, 2019.

(51) Int. Cl.
| | | |
|---|---|---|
| *G01J 5/40* | (2006.01) | |
| *G02B 26/08* | (2006.01) | |
| *G01J 1/04* | (2006.01) | |
| *G01J 1/44* | (2006.01) | |
| *G01J 5/10* | (2006.01) | |
| *G01J 5/00* | (2022.01) | |

(52) U.S. Cl.
CPC ............... *G01J 5/40* (2013.01); *G02B 26/085* (2013.01); *G02B 26/0833* (2013.01); *G02B 26/0866* (2013.01); *G01J 2005/0077* (2013.01); *G01J 2005/106* (2013.01)

(58) Field of Classification Search
CPC .. G01J 2005/106; G01J 1/0407; G01J 1/0411; G01J 1/0437; G01J 1/08; G01J 1/4257; G01J 5/0803; G01J 5/0806; G01J 5/0831; G01J 5/0853; G02B 26/0833; G02B 26/085; G02B 26/0866; G02B 27/145
See application file for complete search history.

(56) References Cited

U.S. PATENT DOCUMENTS

| | | |
|---|---|---|
| 7,491,922 B1 | 2/2009 | Deliwala et al. |
| 7,705,309 B1 | 4/2010 | Jin et al. |
| 10,801,896 B2 | 10/2020 | De Wit et al. |
| 10,900,842 B2 | 1/2021 | De Wit |
| 11,408,773 B2 | 8/2022 | De Wit |
| 2003/0174928 A1* | 9/2003 | Huang .................. G02B 6/359 385/18 |
| 2005/0162090 A1 | 7/2005 | Birman et al. |
| 2006/0097053 A1 | 5/2006 | Jolivet et al. |
| 2006/0111603 A1 | 5/2006 | Shaw |
| 2007/0215703 A1 | 9/2007 | Aoki et al. |
| 2009/0091726 A1 | 4/2009 | Kalf et al. |
| 2010/0025581 A1 | 2/2010 | Aksyuk et al. |
| 2011/0139990 A1 | 6/2011 | Xie et al. |
| 2011/0304470 A1 | 12/2011 | Su et al. |
| 2012/0005053 A1 | 1/2012 | Burgess et al. |
| 2012/0050533 A1 | 3/2012 | Dewa et al. |
| 2012/0261575 A1 | 10/2012 | Averitt et al. |
| 2014/0321772 A1 | 10/2014 | Piche et al. |
| 2015/0102234 A1 | 4/2015 | Gargir et al. |
| 2015/0377711 A1 | 12/2015 | Steffanson et al. |
| 2020/0225084 A1 | 7/2020 | De Wit |
| 2020/0225092 A1 | 7/2020 | De Wit et al. |
| 2021/0140831 A1 | 5/2021 | De Wit |

FOREIGN PATENT DOCUMENTS

| | | |
|---|---|---|
| JP | 2018056414 | 4/2018 |
| KR | 101273462 B1 | 6/2013 |

OTHER PUBLICATIONS

On-Board Radiation Sensing Apparatus, U.S. Appl. No. 17/154,994, filed Jan. 21, 2021, Gabrielle de Wit, Notice of Allowance Mailed—Application Received in Office of Publications, dated Nov. 3, 2021.
Sequential Beam Splitting in a Radiation Sensing Apparatus, U.S. Appl. No. 17/835,794, filed Jun. 8, 2022, Gabrielle de Wit et al., Docketed New Case—Ready for, Jun. 15, 2022.
International Search Report and Written Opinion, PCT/US2020/013178, dated May 15, 2020.

\* cited by examiner

ON-BOARD RADIATION SENSING APPARATUS

RELATED APPLICATIONS

The present application is a continuation application of U.S. patent application Ser. No. 17/154,994, filed Jan. 21, 2021 which is a continuation application of U.S. patent application Ser. No. 16/400,780, filed May 1, 2019, issued as U.S. Pat. No. 10,900,842 on Jan. 26, 2021, which claims priority to U.S. Prov. App. Ser. No. 62/791,193, filed Jan. 11, 2019, entitled "ON-BOARD RADIATION SENSING APPARATUS", U.S. Prov. App. Ser. No. 62/791,195, filed Jan. 11, 2019, entitled "SEQUENTIAL BEAM SPLITTING IN A RADIATION SENSING APPARATUS", and U.S. Prov. App. Ser. No. 62/791,479, filed Jan. 11, 2019, entitled "RADIATION SENSING APPARATUS WITH A LIGHT SOURCE MOUNTED ON A FLEXIBLE PART", the disclosure of which applications are hereby incorporated by reference herein in their entirety.

FIELD OF THE TECHNOLOGY

At least some embodiments disclosed herein relate to on-board electromagnetic radiation detection using micromechanical radiation sensing pixels in general and more particularly but not limited to the on-board sensing of infrared (IR) radiation.

And, at least some embodiments disclosed herein relate to electromagnetic radiation detection using beam splitting in general and more particularly but not limited to the sensing of infrared (IR) radiation using beam splitting in a radiation sensing apparatus with the light source mounted on a flexible part. Also, disclosed herein is a printed circuit board arrangement with a flexible part for an electromagnetic radiation detector.

BACKGROUND

U.S. Pat. No. 9,857,229 discloses a method of fabricating electromagnetic radiation detection devices including: forming a first mask on a substrate; forming a structural layer on the substrate using the first mask; forming a metallic layer overlying the structural layer; removing the first mask; forming a second mask on the substrate, the second mask having mask openings; selectively patterning the metallic layer using the mask openings; and removing the second mask. The entire disclosure of U.S. Pat. No. 9,857,229 is hereby incorporated herein by reference.

U.S. Pat. No. 5,929,440 discloses an electromagnetic radiation detector that has an array of multi-layered cantilevers. Each of the cantilevers is configured to absorb electromagnetic radiation to generate heat and thus bend under the heat proportionately to the amount of absorbed electromagnetic radiation. The cantilevers are illuminated and light reflected by the bent cantilevers are sensed to determine the amount of electromagnetic radiation. The entire disclosure of U.S. Pat. No. 5,929,440 is hereby incorporated herein by reference.

U.S. Pat. No. 9,851,256 discloses a radiation detection sensor including a plurality of micromechanical radiation sensing pixels having a reflecting top surface and configured to deflect light incident on the reflective surface as a function of an intensity of sensed radiation. The sensor can provide adjustable sensitivity and measurement range. The entire disclosure of U.S. Pat. No. 9,851,256 is hereby incorporated herein by reference.

U.S. Pat. No. 9,810,581 discloses an electromagnetic radiation sensing micromechanical device to be utilized in high pixel-density pixel sensor arrays. Arrays of the device can be utilized as IR imaging detectors. The entire disclosure of U.S. Pat. No. 9,810,581 is hereby incorporated herein by reference.

SUMMARY OF THE DESCRIPTION

Described herein are systems, methods, and apparatuses for providing on-board electromagnetic radiation sensing using beam splitting in a radiation sensing apparatus. The beam splitting can occur by a beam splitter such as a partial reflecting surface or a partially-transparent and partially-reflective (light directing) optical element. It is to be understood that a beamsplitter can be or include a light directing device generally. For example, the beamsplitter can be or include a prism. The radiation sensing apparatuses can include a micro-mirror chip including a plurality of light reflecting surfaces. The apparatuses can also include an image sensor having an imaging surface. The apparatuses can also include a beamsplitter unit located between the micro-mirror chip and the image sensor. The beamsplitter unit can include a beamsplitter that includes a reflective surface that is oblique to the imaging surface and the micro-mirror chip. The apparatuses can also include an enclosure configured to enclose at least the beamsplitter and a light source. With the apparatuses, the light source can be attached to a printed circuit board (PCB). Also, the enclosure can include an inner surface that has an angled reflective surface that is configured to reflect light from the light source in a direction towards the beamsplitter. The apparatuses can be utilized for human detection, fire detection, gas detection, temperature measurements, environmental monitoring, energy saving, behavior analysis, surveillance, information gathering and for human-machine interfaces. To put it another way, the apparatuses can be coupled to or controlled from a facility or feature incorporated into a circuit board of a computer or computerized device, such as a mobile device, to provide human detection, fire detection, gas detection, temperature measurements, environmental monitoring, energy saving, behavior analysis, surveillance, information gathering and for human-machine interfaces.

BRIEF DESCRIPTION OF THE DRAWINGS

The present disclosure will be understood more fully from the detailed description given below and from the accompanying drawings of various embodiments of the disclosure.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description.

Figure 1:
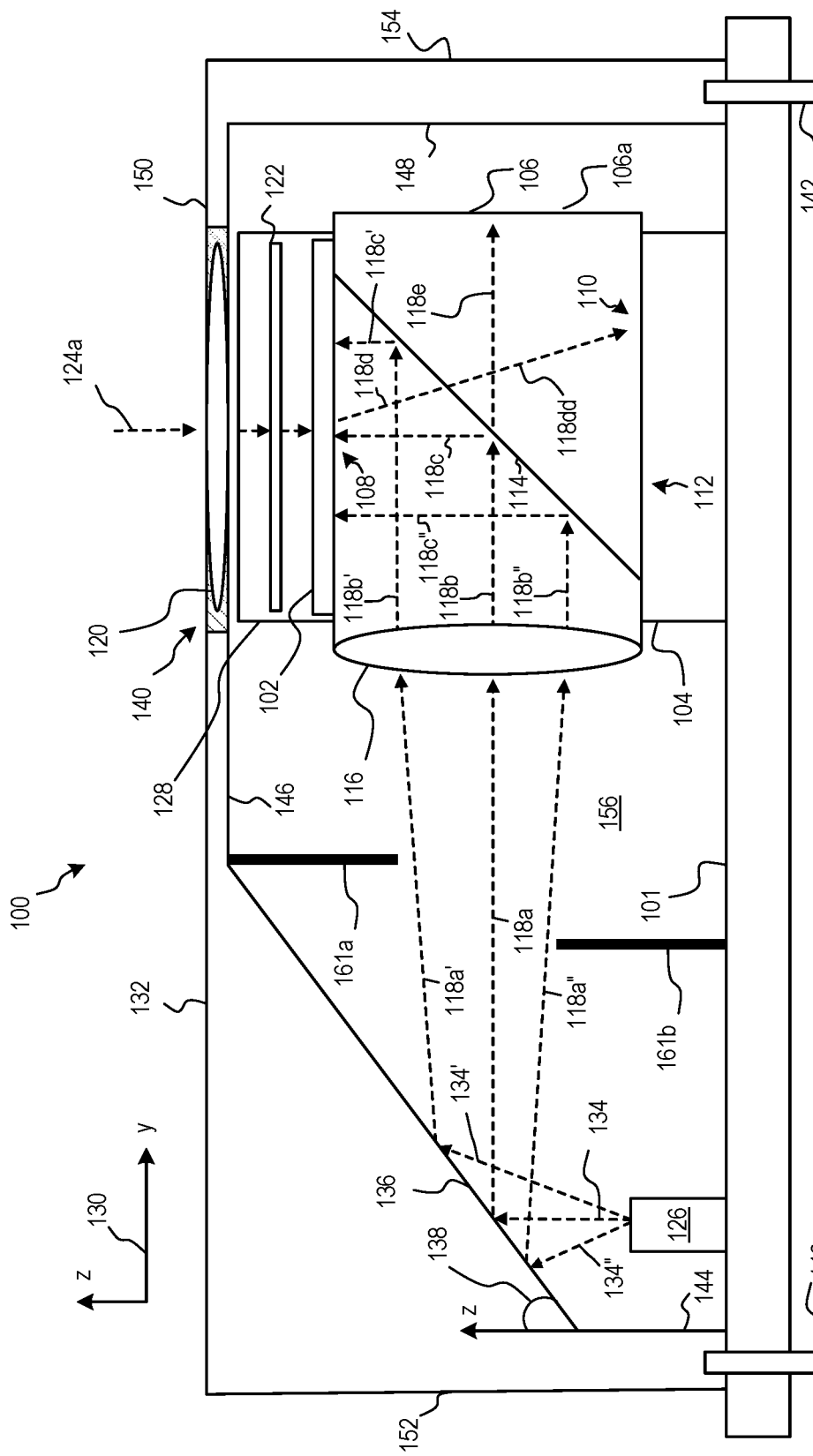
FIG. 1 illustrates an apparatus 100 configured to measure a distribution of electromagnetic radiation according to at least one embodiment where the light source is on the printed circuit board.

FIG. 1 illustrates an on-board electromagnetic radiation sensing apparatus 100 configured to measure a distribution of electromagnetic radiation (such as infrared radiation) according to at least one embodiment. For this disclosure it is to be understood that an on-board electromagnetic radiation sensing apparatus is a type of electromagnetic radiation sensing apparatus that can be coupled to or controlled from a facility or feature incorporated into a circuit board of a computer or computerized device such as a mobile device.

In general, the apparatus (such as apparatus 100 illustrated in FIG. 1) includes a light directing device configured to direct light rays from a light source (such as the light source 126) to light reflecting areas of the micro mirrors of the micro-mirror chip 102. Further included is an imaging area facing the light reflecting area of the micro mirror that is configured to receive reflected light spots formed by the reflections of light rays directed onto the light reflecting area of the micro mirror. Further included is an enclosure configured to enclose the light directing device and the imaging area when the light directing device and imaging area are attached to a printed circuit board (PCB). Also, in exemplary embodiments, the enclosure includes an inner surface that has an angled partially reflective plane (such as a 45-degree reflective plane) that is part of the light directing device. The light directing device can include an optical filter. Further, the light directing device can include a spherical surface facing the light source, which can act as a collimator. The optical filter can be integrated with the collimator or with other planes of the light directing device. Also, in some embodiments, a radiation imaging lens 120 can be included to project environmental radiation onto radiation absorbing surfaces of micro mirrors of the micro-mirror chip 102. The radiation lens (such as an infrared radiation lens) can be a part of the enclosure. Also, an image sensor 104 can be included to capture an image of light spots reflected from the micro mirrors of the micro-mirror chip 102 and formed on the imaging surface. Further, a signal processing unit can be included to correlate and identify light spots on the image to different micro mirrors and calculate a radiation intensity absorbed by each individual micro-mirror through its corresponding light spot motion or light pattern change captured by the image sensor 104.

In FIG. 1, the electronic components of the apparatus 100 are mounted on a PCB 101. The apparatus 100 can be mounted on or attached to a host or carrier PCB, such as one in a mobile device or used to form a separate radiation sensing device that has a wired or wireless data communication capability. The apparatus 100 includes a micro-mirror chip 102, an image sensor 104, and a beamsplitter unit 106 located between the micro-mirror chip 102 and the image sensor 104. The micro-mirror chip 102 includes a plurality of micro-mirrors that have light reflecting surfaces 108 that are illustrated in detail in FIGS. 2-4. The image sensor 104 includes an imaging surface 110. The beamsplitter unit 106 includes a beamsplitter 112, which partially transmits and partially reflects light. A length of the beamsplitter 112 is aligned along a horizontal axis (i.e., the y-axis) that is parallel to the micro-mirror chip and the imaging surface. The horizontal axis (i.e., the y-axis) is perpendicular to the vertical axis (i.e., the z-axis) and an axis going into and out of the plane illustrated in FIGS. 1-6 (i.e., the x-axis). The x-axis is not shown in FIGS. 1-5 and 7-10.

In FIG. 1, there is a single beamsplitter and beamsplitter unit between the micro-mirror chip 102 and the image sensor 104. The beamsplitter 112 can have a rectangular cross section in the yz plan. Further, the beamsplitter 112 includes a partially-reflective surface 114 that is oblique to the imaging surface 110 and the micro-mirror chip 102 and that can extend across more than half the height of the beamsplitter 112. In FIG. 1, the partially-reflective surface 114 extends across the height of the beamsplitter 112.

As illustrated, the micro-mirror chip 102 can be directly fixed to and/or positioned on the beamsplitter unit 106 and the beamsplitter unit 106 can be directly fixed to or mounted on the image sensor 104.

Figure 2:
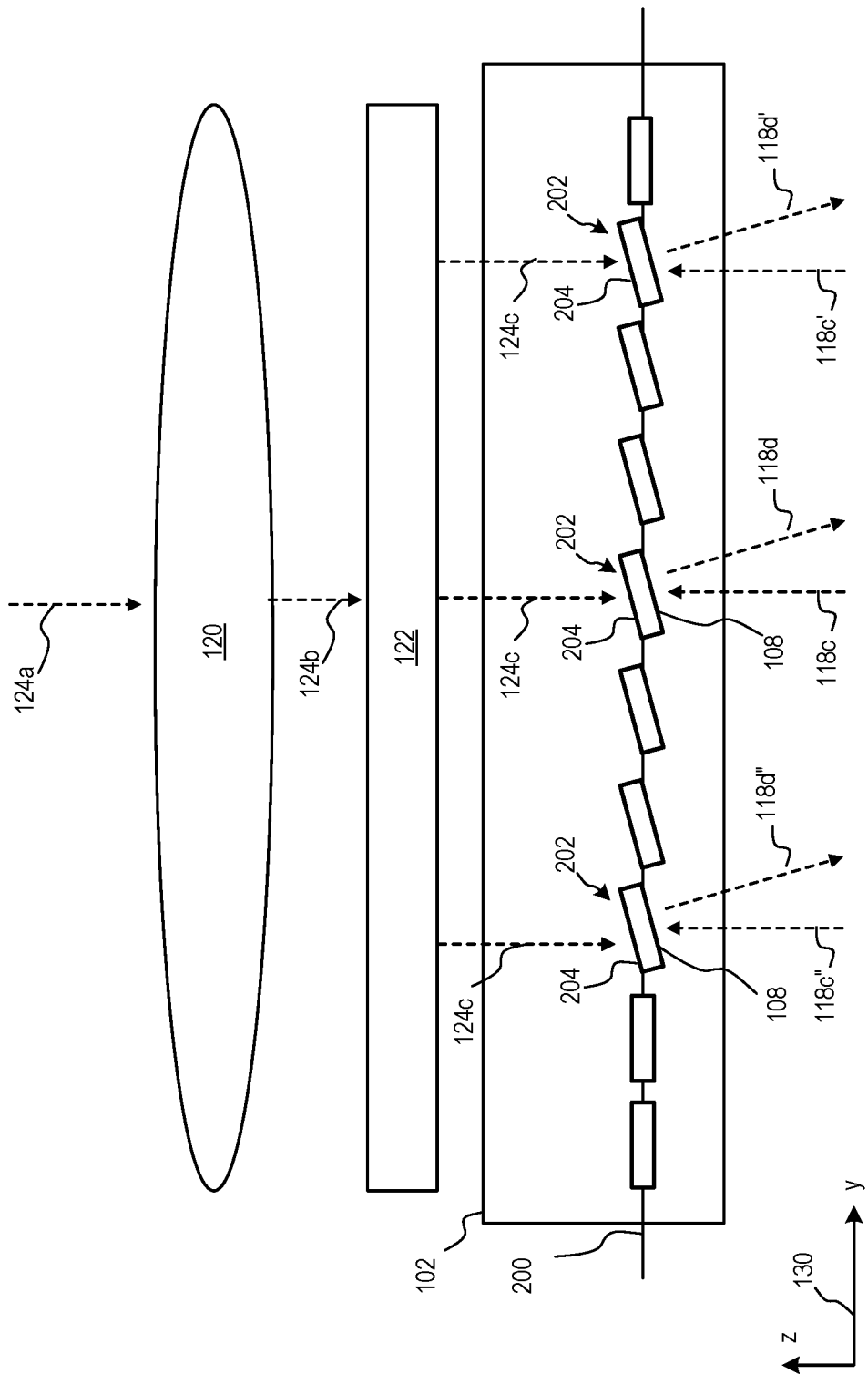
FIG. 2 illustrates some parts of the apparatus illustrated in FIG. 1, and further illustrates the micro-mirror chip of the apparatus.
Figure 3:
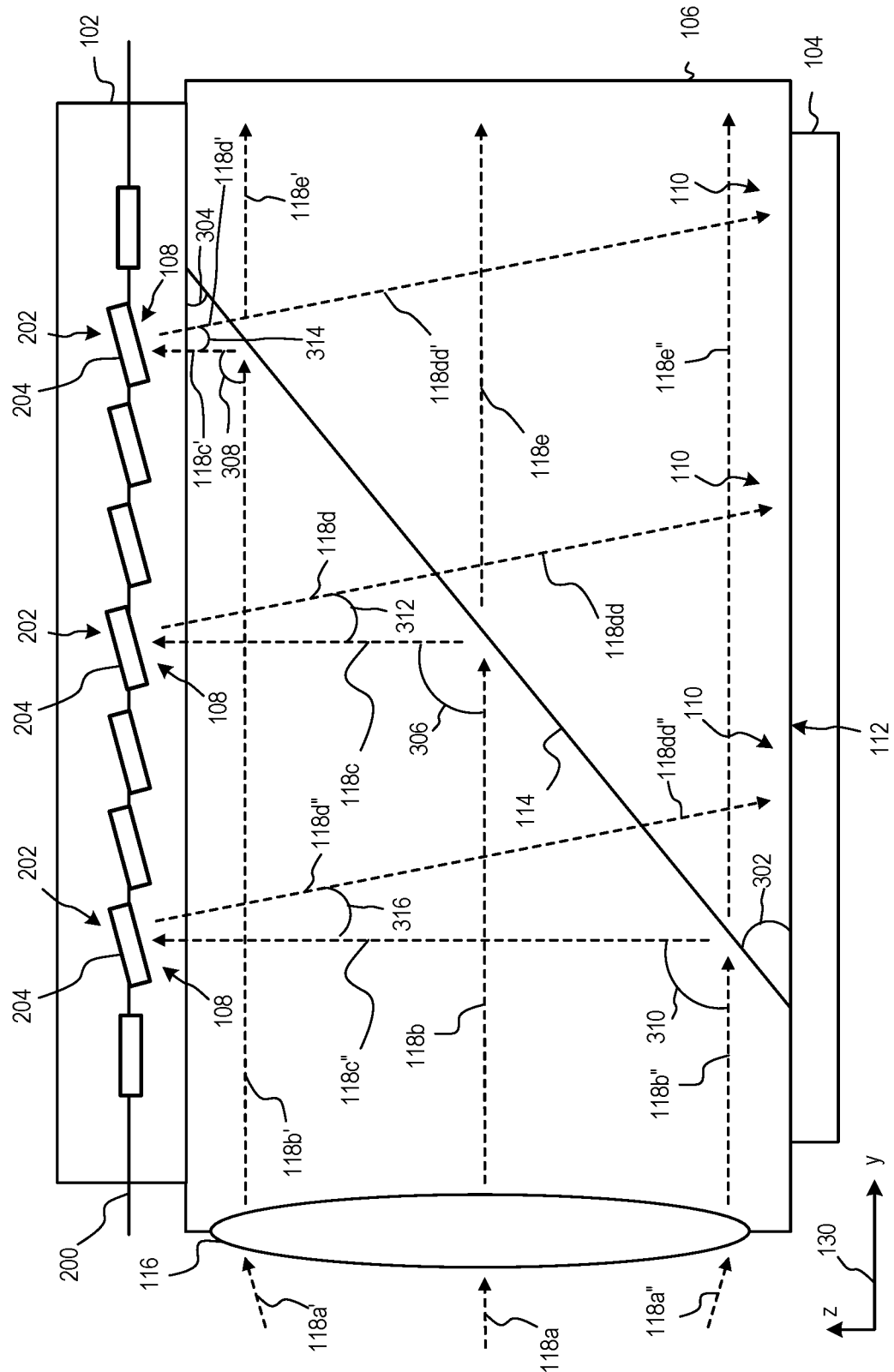
FIG. 3 illustrates some parts of the apparatus illustrated in FIG. 1, and further illustrates the beamsplitter unit of the apparatus.
Figure 4:
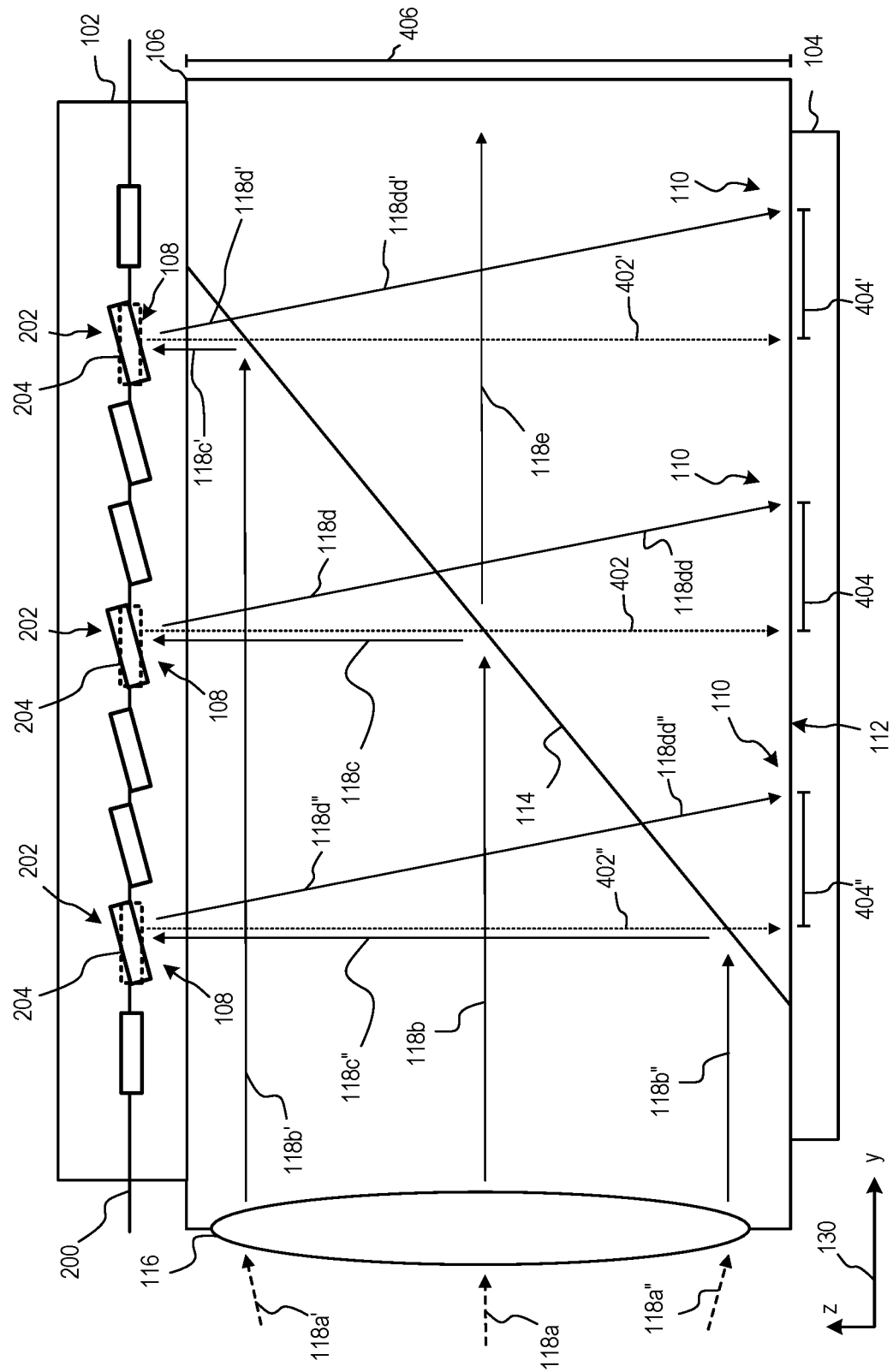
FIG. 4 illustrates some parts of the apparatus illustrated in FIG. 1, and further illustrates mechanisms for displacements of reflected light rays on the imaging surface of the apparatus to determine the intensity of electromagnetic radiation on micro mirrors of the apparatus.

The micro-mirror chip 102 includes a set of micro mirrors that are further illustrated in detail in FIGS. 2-4. A micro mirror includes a radiation absorbing area and a light reflecting area. The micro mirror changes in orientation or position in response to radiation absorbed in the radiation absorbing area. For example, the micro-mirror chip 102 can include a set of micro mirrors formed on a substrate. Each mirror can be a plate having bi-material legs standing on a frame of the substrate. The reflective surface of each mirror plate can be part of a metal layer to form the plurality of light reflecting surfaces 108. The substrate layer of the mirror plate absorbs radiation (such as infrared radiation) to raise the temperate of the plate. The radiation absorption surface can be on the opposite side of the plate from the reflective surface. The bi-material legs bend according to the plate template to rotate the plate and hence the reflective surface. The rotation angle of the plate represents the temperature and/or the intensity of the absorbed radiation by the plate. Some additional aspects of some embodiments of the micro-mirror chip 102 are disclosed in U.S. Pat. No. 9,810,581.

The image sensor 104 can be a CMOS (or CCD) based image sensor. The image sensor 104 can be connected to or include an integrated signal processor such as an integrated ASIC, microcontroller, microprocessor or field-programmable gate array (FPGA). In some embodiments, a signal processor can be connected via the PCB 101 (e.g., see signal processing unit 702 of FIG. 7). The CMOS image sensor can be configured to receive rays of light reflected from the micro-mirror chip, in the purpose of detecting certain electromagnetic radiation such as infrared (IR) radiation according to this system; and the rows and columns of light dots or light patterns reflected by the micro-mirrors and captured by the CMOS image sensor can be analyzed to measure the deflected distances of the light dots and thus the radiation intensity or temperature of the radiation image formed on the micro-mirror chip.

As illustrated in FIG. 1, the radiation sensing apparatus 100 can also include an enclosure 132 configured to enclose the beamsplitter 112 and a light source 126. The light source 126 is attached to the PCB 101. For example, the light source 126 can be a light emitting diode (LED) mounted on the PCB 101 and connected to the circuit formed on the PCB 101. The light source 126 can be a LED with an emissivity of blue color (e.g. 450$nm$ wavelength), white light, UV light or any color in the visible or near IR spectrum. The enclosure 132 includes interior surfaces that include an angled reflective surface 136 that is configured to reflect light rays 134, 134', and 134" from the light source 126 towards the beamsplitter 112 as reflected light rays 118$a$, 118$a'$, and 118$a''$. The reflective surface 136 is positioned between the light source 126 and a lens (116) such that the mirror image of the light source as reflected by the surface 136 as a mirror is positioned at a focal point of the lens 116. Thus, the lens 116 converts the non-collimated and diverging lights 118$a$, 118$a'$, and 118$a'$ from the point light source (126) as reflected by the surface 136 into collimated light rays 118$b$, 118$b'$, and 118$b''$ that are parallel to the imaging surface and the micro-mirror chip 102. The collimated light rays can be substantially parallel (as shown in FIG. 1 schematically), or slightly converging or diverging. In some embodiments, the lens 116 can have a flat surface and if the light source is at a distance which is substantially larger than the height of the lens then the light rays are refracted upon entering the beam splitter, and thus diverge within the beamsplitter element. In some embodiments, a spherical or aspherical surface of the lens is not needed and the lens can have a flat surface and the schematically shown parallel light rays can be diverging. The reflective surface allows the light source 126 to be mounted on the PCB 101, directing lights in a direction substantially perpendicular to the PCB 101. Such an arrangement can reduce the length (e.g., in the y axis) of the device and/or simplify the procedure for assembling component during manufacturing of the apparatus 100. The enclosure 132 also includes interior surfaces 144, 146, and 148 that can be non-reflective and/or less reflective than the surface 136; and the enclosure 132 has exterior surfaces 150, 152, and 154. Exterior surfaces 152 and 154 are side surfaces of the enclosure 132, and exterior surface 150 is a top exterior surface of the enclosure 132. The exterior surface 150 includes an opening 140 to a chamber 156 of the enclosure 132. The opening 140 traverses a top wall of the enclosure 132 from the exterior surface 150 of the top wall to the interior surface 146 of the top wall. The purpose of the opening 140 can be to position and/or fix the lens 120.

The interior surface 144 is side interior surface next to the angled reflective surface 136 and parallel to the z-axis. Interior surface 146 is a top interior surface next to the angled reflective surface 136 and perpendicular to the z-axis and the interior surface 144. The angled reflective surface 136 is between the surfaces 144 and 146. Interior surface 148 is a side interior surface next to the interior surface 146 and is shown parallel to the z-axis and the interior surface 144. The interior surface 148 faces the interior surface 144 and the angled reflective surface 136. The micro-mirror chip 102, the beamsplitter unit 106, and the image sensor 104 are housed within the interior surfaces 144, 146, and 148 as well as the angled reflective surface 136. These interior surfaces with the upper surface of the PCB 101 form the chamber 156 configured to enclose the micro-mirror chip 102, the image sensor 104, and the beamsplitter 106. The enclosure can be sealed or hermetically sealed to isolate the chamber 156 from light, radiation, humidity, particles, gases or dust pollution.

Also, the chamber 156 includes the angled reflective surface 136 that is oblique to the imaging surface 110 and the micro-mirror chip 102 and configured to reflect light from the light source 126 towards the beamsplitter 112.

In some embodiments, the chamber 156 houses the micro-mirror chip 102, the image sensor 104, and the beamsplitter 106 entirely. In some embodiments, the micro-mirror chip 102 is partially within the opening of the enclosure and partially within the chamber 156.

Figure 7:
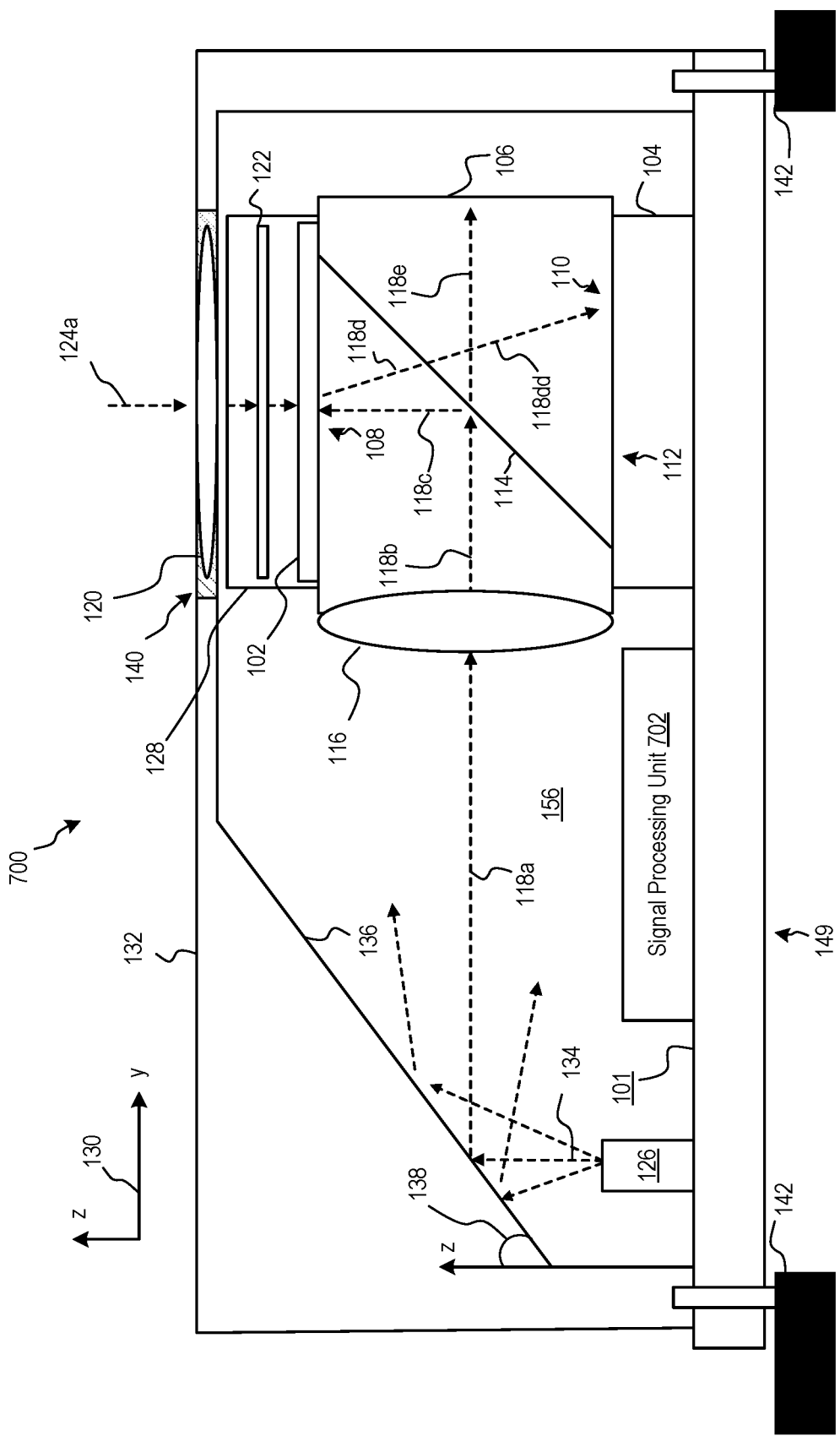
FIG. 7 illustrates another apparatus 700 configured to measure a distribution of electromagnetic radiation according to at least one other embodiment where a signal processing unit is integrated with or directly attached to the image sensor.
Figure 8:
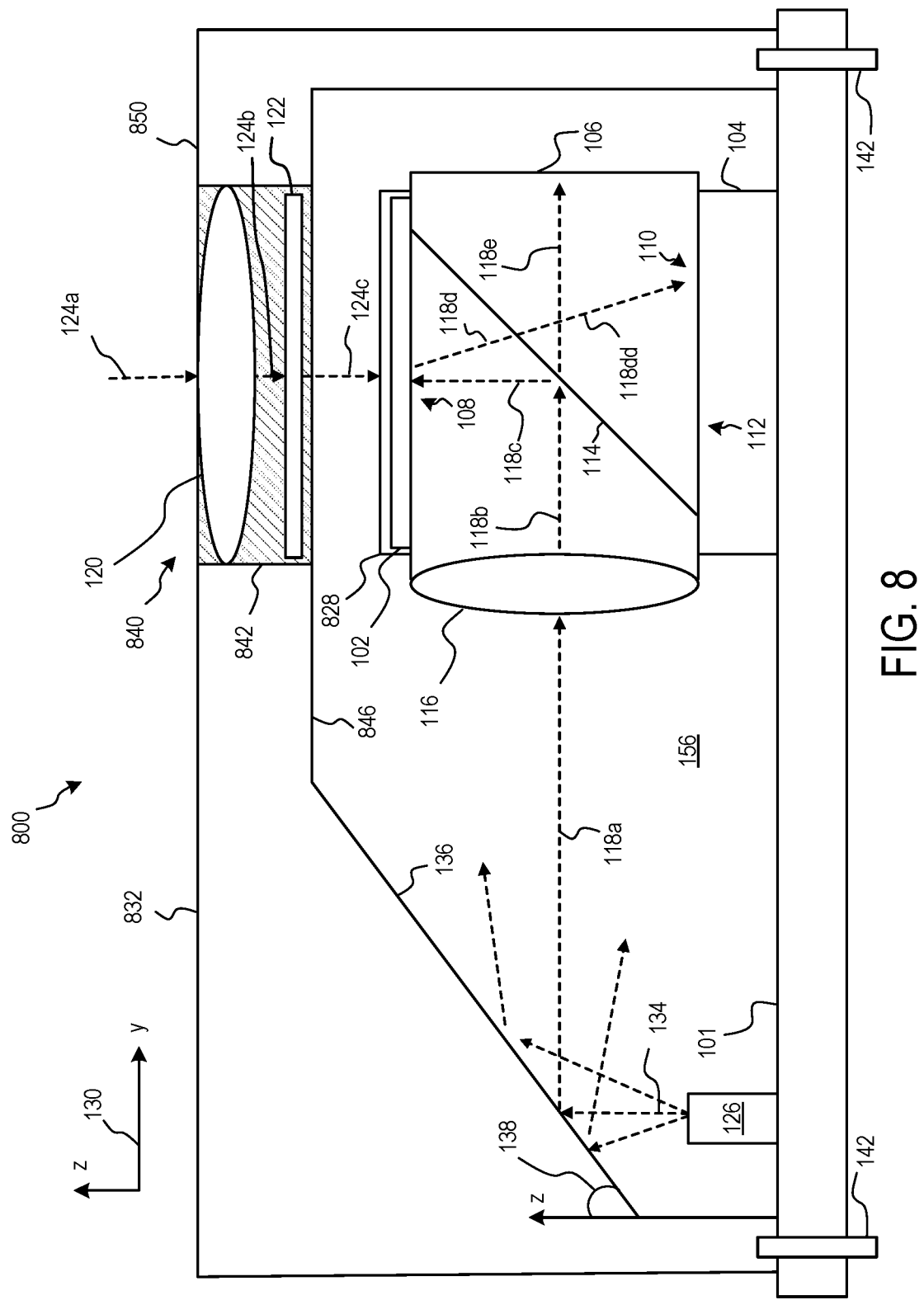
FIG. 8 illustrates another apparatus 800 configured to measure a distribution of electromagnetic radiation according to at least one other embodiment where a radiation lens and a radiation filter are within an opening of the enclosure that is above the micro-mirror chip.
Figure 9:
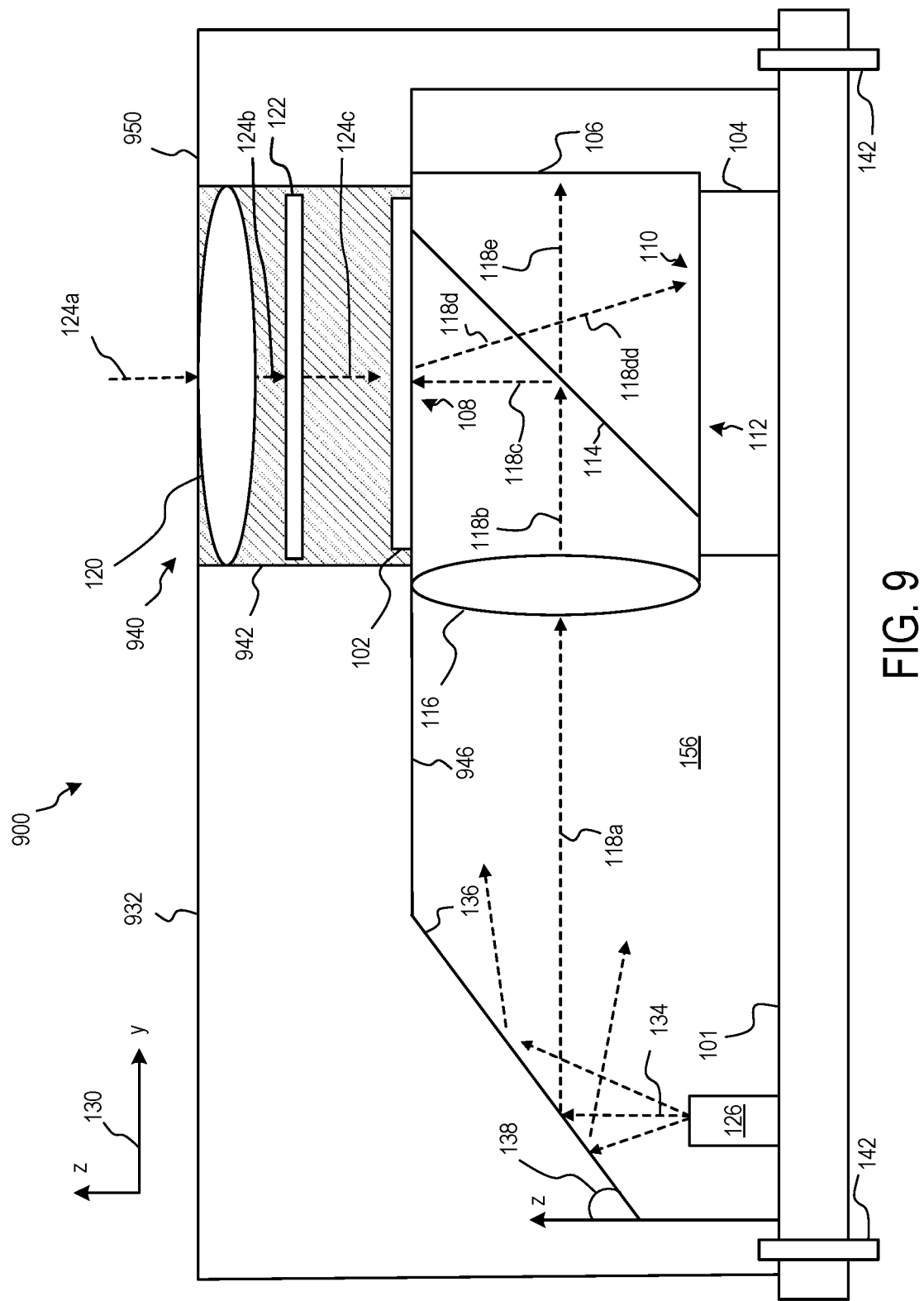
FIG. 9 illustrates another apparatus 900 configured to measure a distribution of electromagnetic radiation according to at least one other embodiment where a radiation lens, a radiation filter, and the micro-mirror chip are within an opening of the enclosure that is above the beamsplitter unit.
Figure 10:
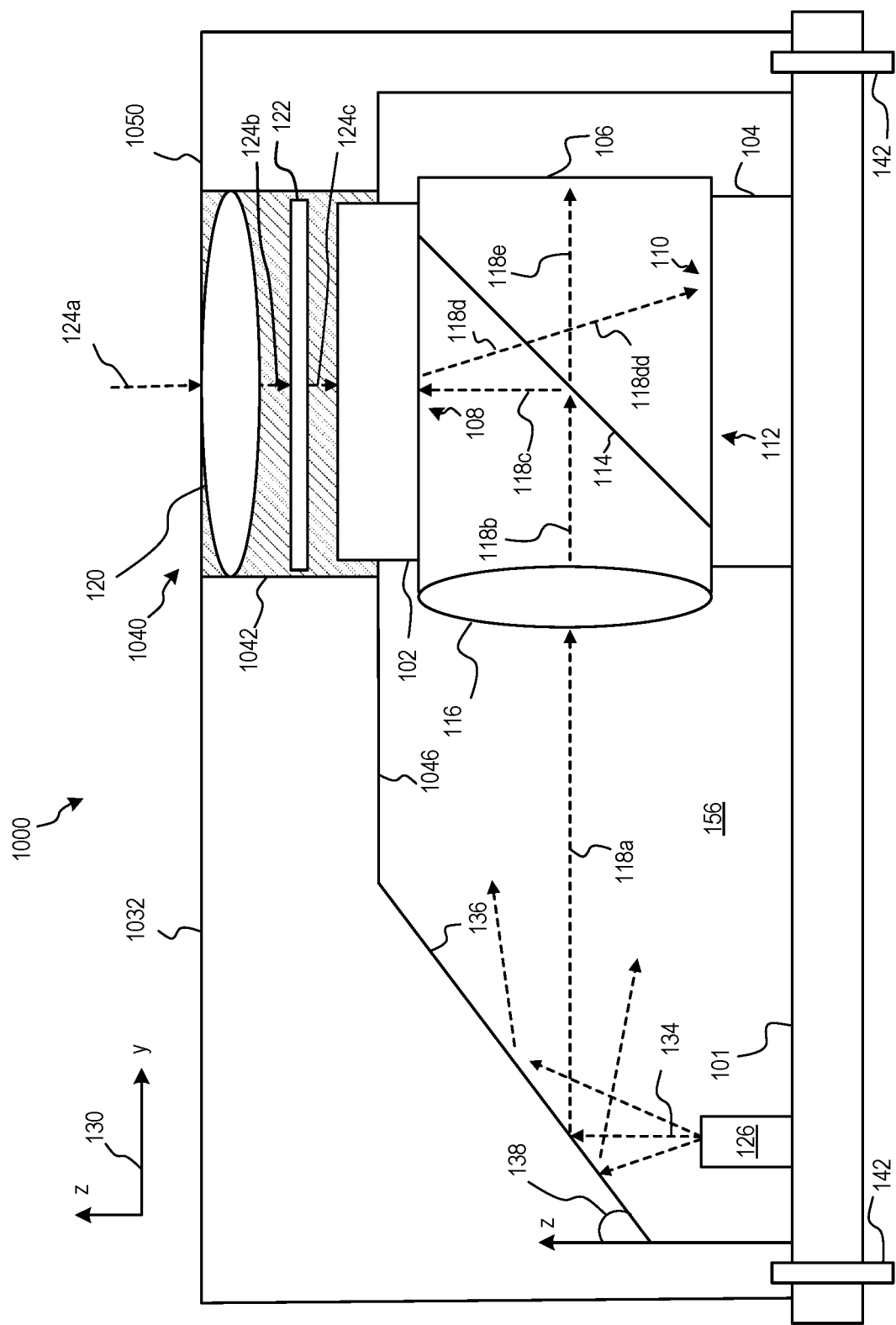
FIG. 10 illustrates another apparatus 1000 configured to measure a distribution of electromagnetic radiation according to at least one other embodiment where a radiation lens and a radiation filter are within an opening of the enclosure that is above the beamsplitter unit, and where the micro-mirror chip is partially within the opening.
Figure 11:
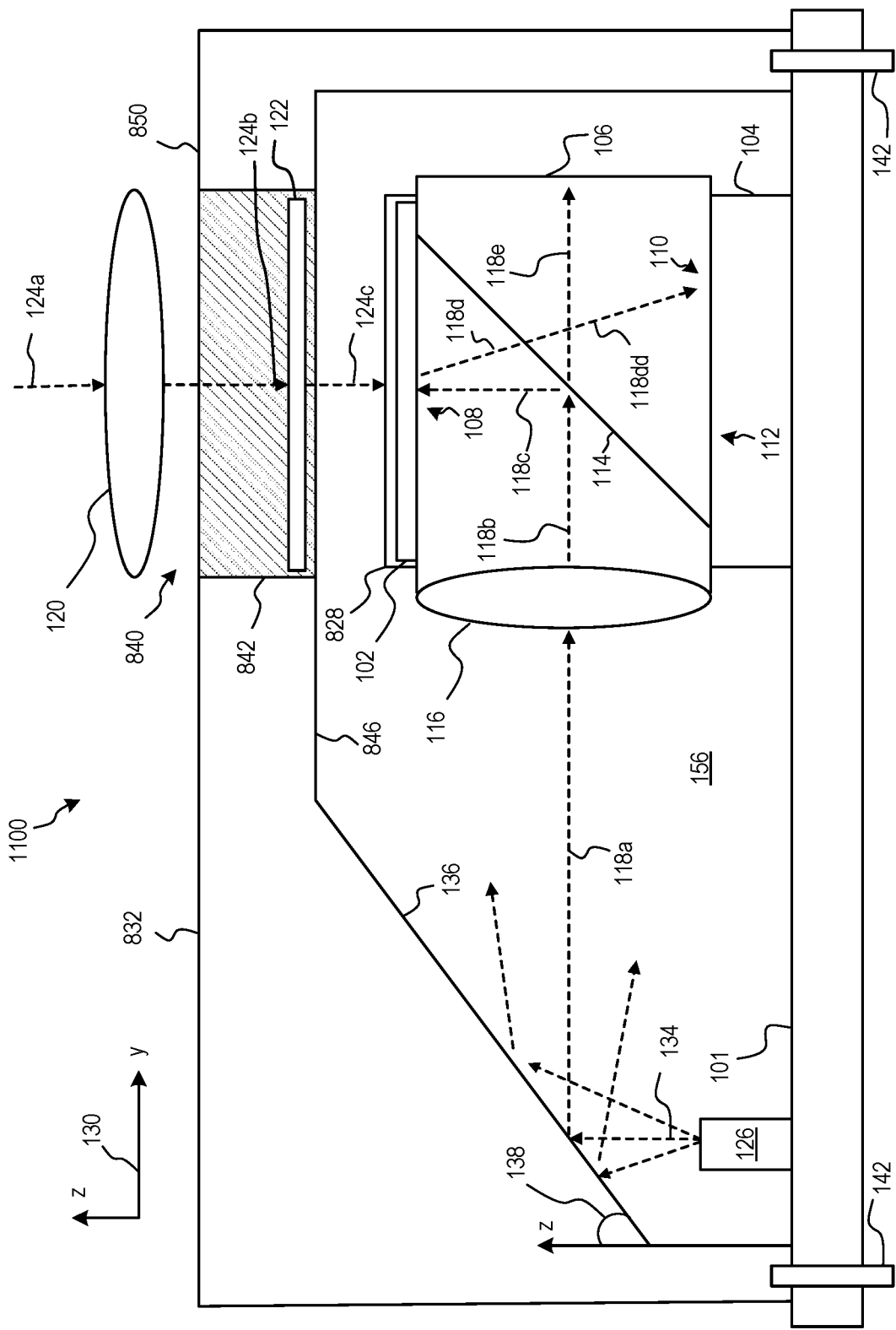
FIG. 11 illustrates another apparatus 1100 configured to measure a distribution of electromagnetic radiation according to at least one other embodiment where a radiation filter is within an opening of the enclosure that is above the micro-mirror chip and the radiation lens 120 is external to the apparatus, such as on a separate apparatus or structure.

FIGS. 1, 5, 7, 8, 9, 10, and 11 illustrate some different embodiments of the enclosure of the apparatus. These different embodiments are described in more detail herein. In general, as shown in FIGS. 1, 5, 7, and 8, the enclosure 132 (or enclosure 832 of FIG. 8) is configured to enclose the micro-mirror chip 102, the light reflecting surfaces 108, the imaging surface 110, the imaging sensor 104, and the beamsplitter unit 106. As shown in FIG. 10, the enclosure 1032 is configured to enclose the light reflecting surfaces 108, the imaging surface 110, the imaging sensor 104, and the beamsplitter unit 106. As shown in FIG. 9, the enclosure 932 is configured to enclose the imaging surface 110, the imaging sensor 104, and the beamsplitter unit 106.

Also, as shown in FIGS. 8-10, the enclosures 832, 932, and 1032 can optionally include a radiation filter 122 within the respective openings 840, 940, and 1040 of the enclosures and between the radiation lens 120 and the micro-mirror chip 102 such that radiation 124$b$ that emits from the radiation lens passes through the radiation filter 122 onto the plurality of radiation absorption surfaces of the micro-mirror chip 102.

Further, shown in FIG. 1 as well as some of the other drawings, the enclosure 132 is attached to the PCB 101 by pins 142. In this sense, the enclosure 132 is a housing of the apparatus 100 attached to the PCB 101 by pins 142. The pins 142 can be configured to fit and align the enclosure 132 to the PCB 101. Alternatively, instead of using alignment pins 142 to align and fix the enclosure 132 to the PCB 101, these parts as well as other parts of the overall system can be aligned by different means and fixed to each other with glue. Alignment pins can be present on the beamsplitter to align and fix it to the PCB 101, with the image sensor 104 being in between the beamsplitter and the PCB 101.

Also, as depicted in FIG. 1, the light source 126 emits light rays, including light ray 134, upwards in the general direction of the z-axis. To reflect light towards a lens 116 integrated with the beamsplitter unit 112, the enclosure 132 includes the angled reflective surface 136 that is skewed from the z-axis at angle 138. In some embodiments, the angle 138 is 45 degrees so that a center ray, e.g., light ray 134, of the light rays emitted by the light source 126, is reflected at a 90-degree angle towards the lens 116. In such embodiments, the angled reflective surface 136 is a 45-degree reflective surface that is 45 degrees from the imaging surface 110, for example. Also, in such embodiments, when the light source 126 emits a center light ray along the z-axis (such as light ray 134), the 45-degree reflective surface is configured to reflect the center light ray at a 90-degree angle in a direction towards the beamsplitter 112. Further, as shown in FIG. 1, the partially-reflective surface 114 of the beamsplitter 112 can be parallel to the angled reflective surface 136. Thus, in embodiments with a 45-degree partially-reflective surface 114 that is 45 degrees from the imaging surface and 45 degrees from the micro-mirror chip, the angled reflective surface 136 can be 45 degrees from the imaging surface and 45 degrees from the micro-mirror chip as well.

As illustrated in FIG. 1, the lens 116 can be integrated with the beamsplitter unit 106. In some embodiments, the lens 116 can be integrated by cutting the right-side half of the lens 116 off to have a flat surface to attach the lens to the flat surface of the beamsplitter unit 106. In some other embodiments, the lens 116 is formed directly on the beamsplitter unit 106.

The lens 116 is shown configured to direct light rays, such as light rays 118a, 118a', and 118a", onto a partially-reflective surface 114 of the beamsplitter 112 as light rays 118b, 118b', and 118b" respectively. Specifically, the lens 116 collimates and produces parallel light rays from the light rays 118a, 118a' and 118a" from the light source 126, which can be a point source, as reflected by the surface 136. The lens 116 collimates non-collimated light rays 118a, 118a', and 118a" into collimated light rays 118b, 118b', and 118b" respectively. A sphere or at least a partial sphere can be the basis for the lens that makes the rays of light parallel. The non-collimated light rays 118a, 118a', and 118a" are reflected light rays reflected from the angled reflective surface 136 which is an interior surface of the enclosure 132. It is to be understood that the parallel light rays described herein can be substantially parallel light rays. In some embodiments the reflective surface may not be flat and can be spherical or aspherical in order to compensate optical aberrations of the lens to create a better collimation of light rays. In some embodiments the light rays do not have to be parallel or substantially parallel, but can converge slightly in order to project a smaller image of the micro-mirrors onto the image surface. Nevertheless, the center light ray can run parallel or substantially parallel to the image surface plane and the micro-mirror plane, whilst the outer light rays converge towards the center light ray.

Initially, a light source 126 emits light rays 134, 134', and 134" towards the angled reflective surface 136, and then the non-collimated light rays 118a, 118a', and 118a" are reflected from the angled reflective surface 136. The light source 126 can include a light emitting diode (LED). As shown, the light source 126 is directly attached to the PCB 101. The light rays 134, 134', and 134" can be emitted as a cone shape with the tip of the cone shape at the light source 126. To direct these rays, which can be emitted in a cone shape and can also be reflected off the angled reflective surface 136 in a shape somewhat similar to a cone shape, the lens 116 converts the rays 118a, 118a', and 118a" to parallel light rays 118b, 118b', and 118b" for entering the beamsplitter 112.

In examples using an LED, the light source 126 can include or be integrated with a pinhole, a cone or an emission light directing device (such as a reflector or aperture stops). In such examples, the LED can be configured to emit rays of light, such as visible light, upwards from the PCB according to the pinhole and the cone. The light in such examples is restricted and/or defined by the pinhole or the light directing devices.

As illustrated in FIG. 1 partially, the partially-reflective surface 114 splits each of the collimated light rays 118b, 118b', and 118b" split into two light rays. For example, the partially-reflective surface 114 splits the incoming collimated light ray 118b into a light ray 118c reflected towards the micro-mirror chip 102 and a light ray 118e that penetrates through the partially-reflective surface 114. The collimated light rays each split into two light rays at the partially-reflective surface 114 of the beamsplitter 112. The light rays 118b, 118b', and 118b" are reflected by the beamsplitter 112 off of the reflective surface 114 to become light rays 118c, 118c', and 118c" travelling towards the plurality of light reflecting surfaces 108 of the micro-mirror chip 102, and the light rays 118e, 118e', and 118e" (which are shown in FIG. 3) transmit through the reflective surface 114 of the beamsplitter 112. These initially transmitted light rays 118e, 118e', and 118e" have no functionality in the operating principle of the apparatus. These light rays can either exit the beamsplitter or the back side of the beamsplitter or the backside can be light absorbing so these light rays get absorbed or scattered on the beamsplitter surface 106a. The light rays 118c, 118c', and 118c" are shown reflecting off three of the reflecting surfaces of the plurality of light reflecting surfaces 108 as light rays 118d, 118d', and 118d", respectively. The light rays 118d, 118d', and 118d" are again split by the partially-reflective surface 114 where the penetrating rays go towards the imaging surface 110 of the image sensor 104 as light rays 118dd, 118dd', and 118dd", respectively (e.g., See FIG. 3). As the light rays 118d, 118d', and 118d" pass again through partially-reflective surface 114 a portion of these light rays will be reflected towards the lens 116.

In some embodiments, the beamsplitter is configured to split an incoming light ray from the light source into a first light ray and a second light ray, where the first light ray is reflected by the beamsplitter towards the plurality of light reflecting surfaces of the micro-mirror chip and the second light ray passes through the beamsplitter towards a sidewall of the enclosure (such as sidewall 148). Preferably, the sidewall 148 is non-reflective and absorbs the second light ray. In such embodiments, each light reflecting surface of the plurality of light reflecting surfaces of the micro-mirror chip can reflect a light ray that is split again at the reflective surface of the beamsplitter into a third light ray and a fourth light ray such that the third light ray passes through the reflective surface to the imaging surface of the image sensor and the fourth light ray is reflected to towards the light source 126.

As illustrated in FIG. 1, a radiation lens 120 can be used to direct radiation rays 124a, through an optional radiation filter 122, towards micro mirrors of the micro-mirror chip 102. As shown the lens 120 is located in the opening 140 directly above a housing 128 of a radiation filter 122 and the micro-mirror chip 102. In this sense, the enclosure 132 includes the radiation lens 120 within the opening 140 of the enclosure, and the opening 140 is located above the micro-mirror chip 102 such that radiation that passes through the opening and the radiation lens 120 emits onto a plurality of radiation absorption surfaces of the micro-mirror chip 102 (e.g., radiation absorption surfaces 204 illustrated in FIG. 2). In some embodiments, the radiation lens 120 is embedded within a cone enclosure that can be fitted into the opening of the enclosure or some other fitting mechanism to fit an optical lens into a housing (e.g., gluing, press-fit, retaining ring, thread, etc).

As illustrated in FIG. 1, the apparatus can contain an aperture, aperture stop or generally a light ray guiding or restricting structure, such as schematically shown with simple plates in its cross section 161a and 161b, within the chamber 156, between the light source 126 and the beamsplitter unit 106. The functionality of such light ray guiding or restricting structure is to eliminate parasitic light scatter. For example, the light source 126 can be a point source with an emissivity angle of 180 degree. Some light rays can travel directly from the light source towards the direction of the beamsplitter unit 106 and can cause unwanted parasitic ("stray light") or disturbing pattern or hinder the light rays to be collimated. In other instances, some reflected light rays of surface 136 may be outside the cone and/or entrance angle and be positioned in such way that they travel from surface 136 towards surface 146 and reflect off surface 146 to enter the beamsplitter causing some unwanted light patterns onto the imaging surface. A light ray guiding or restricting structure, such as a simple circular or other opening can help or define light rays to form an opening cone. This can include light rays to travel from the aperture of lens 116 to the point source such as the focal point of the lens 116. A light ray guiding or restricting structure can be part of the enclosure 132, as illustrated with structure 161a. A light ray guiding or restricting structure can be mounted onto the PCB 101 as illustrated with 161b. In some instances, a light ray guiding or restricting structure can be a separate part positioned within the chamber 156.

FIG. 2 illustrates some parts of the apparatus 100 illustrated in FIG. 1, and further illustrates the micro-mirror chip 102 of the apparatus 100.

As shown in FIG. 2, the radiation filter 122 can filter the directed radiation before the radiation is received by micro mirrors 202. Specifically, as shown, the radiation filter 122 can filter the directed radiation before the radiation is received by radiation absorption surfaces 204 of the micro mirrors 202. Reflective surfaces of the micro-mirrors provide the plurality of light reflecting surfaces 108. Also, as shown, the plurality of light reflecting surfaces 108 are on respective opposing sides to respective radiation absorption surfaces 204.

In general, light emitted from a light emitting source (such as the light source 126, which can be or include a light emitting diode) is eventually reflected off the plurality of light reflecting surfaces 108 of the micro-mirror chip 102 according to the orientations of the plurality of light reflecting surfaces 108. And, the orientations result from the respective amounts of radiation received by each of the radiation absorption surfaces 204 of the micro-mirror chip 102. The orientations of the light reflecting surfaces 108 effect the angles 312, 314, and 316 depicted in FIG. 3. FIG. 2 illustrates the radiation rays 124c causing certain micro mirrors 202 to change in orientation, and thus effecting the angle in which light rays 118c, 118c', and 118c" reflect off each of the respective surfaces of the plurality of light reflecting surfaces 108 as respective reflected light rays 118d, 118d', and 118d".

As shown in FIG. 1, the lens 120 can be above the housing 128 of the radiation filter 122 and the micro-mirror chip 102. The lens 120 is shown in FIGS. 1 and 2 as configured to direct rays of radiation, such as radiation rays 124a, to the radiation filter 122 as radiation rays 124b (as shown in FIG. 2).

The radiation filter 122 can have different filtering characteristics. For example, the radiation imaging lens can be an infrared lens made of e.g., Germanium, Silicon, polymer, chalcogenide, glass and the like.

As shown in FIG. 2, the radiation imaging lens is arranged in relation with micro mirrors 202 of the micro-mirror chip 102 to form an image of the radiation (e.g., infrared radiation) on a mirror plane 200 of the micro mirrors 202. The radiation image is derived from radiation rays 124c.

The radiation intensity provided by radiation rays 124c can correspond to light ray displacement on the imaging surface 110 of the image sensor 104 (such as light ray displacements 402 and 404 as shown in FIG. 4). Light ray displacement, produced by a respective micro mirror of the micro mirrors 202, corresponds to the intensity of a pixel of the radiation image derived from the radiation filter 122 at the location of the respective micro mirror. Light ray displacement can be generally caused by the displacement of the micro-mirrors. Micro-mirrors can be displaced by absorbing radiation. In some instances, micro-mirrors are displaced through gravitational forces, and/or through its operational temperature fluctuation. To distinguish between incoming radiation displacement versus parasitic (e.g., gravitational or operational temperature) displacement, reference micro-mirror(s) can be implemented which are hidden from radiation flux, but deflect only from gravity or operational temperature variation.

As shown in FIG. 1, the plurality of light reflecting surfaces 108 faces the imaging surface 110, and as illustrated in FIG. 2, each light reflecting surface of the plurality of light reflecting surfaces 108 includes a mirror that moves independent of the other mirrors of the plurality of light reflecting surfaces 108 according to radiation sensed and/or absorbed by the radiation absorption surfaces 204.

In some embodiments, the micro-mirror chip can include a glass cap facing downwards towards the image surface and a radiation transparent cap facing upwards towards the lens 120.

In some embodiments, the micro-mirror chip includes at least one row of micro mirrors arranged along a first direction in a first plane, each respective micro mirror in the row of micro mirrors having a radiation absorbing surface and a light reflecting area positioned at an opposite side of the radiation absorbing surface, where the respective micro mirror is configured to rotate along a second direction in the first plane in response to radiation absorbed in the radiation absorbing surface. In such embodiments, a CMOS image sensor can include an imaging surface facing the light reflecting area of the respective micro mirror to receive a reflected light ray of the respective light ray directed onto the light reflecting area of the respective micro mirror, the imaging surface positioned in relation with the row of micro mirrors to produce equal displacements of light rays reflected from at least two of the row of micro mirrors onto the imaging surface for equal rotations along the second direction in the row of micro mirrors. In such embodiments, the CMOS image sensor can include an imaging surface facing the light reflecting area of the respective micro mirror to receive lights of different optical characteristics reflected from different micro mirrors in the row. The different optical characteristics can include different light intensities. Also, the different optical characteristics can include different shapes of the light. Further the displacements of the micromirrors can result in projecting a changing pattern on the image surface.

FIG. 3 illustrates some parts of the apparatus 100 illustrated in FIG. 1, and further illustrates the beamsplitter unit 106 of the apparatus.

As illustrated in FIGS. 1 and 3, the length of the beamsplitter 112 is oriented in a direction 130 that is parallel to the micro-mirror chip 102 and the imaging surface 110. Note that the direction 130 is also shown in FIGS. 1-5 and 7-10 as a direction of reference for the other aspects of and related to the apparatus 100.

As shown in FIG. 3 as well as FIG. 1, the beamsplitter unit 106 includes beamsplitter 112 including a semi-reflective and semi-transparent surface 114 that is oblique to the imaging surface 110 and the micro-mirror chip 102. As shown, the reflective surface 114 can extend across more than half the height of the beamsplitter. As shown, the reflective surface 114 extends across the height of the beamsplitter 112. The reflective surface 114 can be coated with an optical film that causes exactly 50:50 reflection-transmission splitting of light rays at the surface.

As illustrated in FIG. 3, the partially-reflective surface 114 is oblique to the imaging surface 110 at an angle 302. The partially-reflective surface 114 is oblique to the micromirror chip 102 at an angle 304. As described in detail herein, in some embodiments, the angles 302 and 304 are 45-degree angles. In some embodiments, the beamsplitter 112 is arranged in a direction that is not parallel to the micro-mirror chip 102 and/or the imaging surface 110, the angles 302 and 304 are different from each other (not shown in the drawings). Also, in some embodiments, the angles 302 and 304 can be the same but are less than or greater than 45-degree angles.

As shown in FIG. 3, the beamsplitter 112 is configured to split light rays 118b, 118b', and 118b" to light rays 118c, 118c', and 118c" and light rays 118e, 118e', and 118e", respectively. As shown, the light rays 118c, 118c', and 118c" reflect from the beamsplitter 112 at the partially-reflective surface 114 at angles 306, 308, and 310, respectively, toward the micro-mirror chip 102. The light rays 118e, 118e', and 118e" pass through the beamsplitter 112 towards the back of the beamsplitter unit 106. Each light reflecting surface of the plurality of light reflecting surfaces 108 of the micro-mirror chip 102 reflects light rays 118d, 118d', and 118d", at angles 312, 314, and 316 respectively, which are split again at the partially-reflective surface 114 as the penetrating light rays 118dd, 118dd', and 118dd" towards the image sensor 104, respectively, and other light rays back towards the lens 116 (not shown in the drawings). The light rays 118dd, 118dd', and 118dd" pass through the partially-reflective surface 114 to reach the imaging surface 110 of the image sensor 104.

In some embodiments, the beamsplitter unit includes a beamsplitter having a 45-degree partially-reflective surface that is 45 degrees from the imaging surface and 45 degrees from the micro-mirror chip. The first 45-degree reflective surface can extend across more than half the height of the beamsplitter (e.g., the 45-degree reflective surface can extend across the entire height of the beamsplitter). As mentioned herein, each of angles 302 and 304 can be 45 degrees. This can occur when the length of the beamsplitter is aligned horizontally with and parallel to the micro-mirror chip and the imaging surface of the image sensor. Although it appears in FIG. 3 that the angles 302 and 204 are approximately 45 degrees, for the present disclosure it shall be understood that the aforesaid angles can vary.

In such embodiments with the beamsplitter having a 45-degree reflective surface and its length being aligned in parallel to the micro-mirror chip and the imaging surface, the angles 306, 308, and 310 can be 90-degree angles with respect to the direction 130 (the direction 130 being parallel to the micro-mirror chip 102 and the imaging surface 110). To put it another way, in such embodiments, the angles 306, 308, and 310 are 90-degree angles with respect to the micro-mirror chip 102 and the imaging surface 110. In such embodiments, when light reflecting surfaces of the plurality of light reflecting surfaces 108 that reflect the light rays 118c, 118c', and 118c" are aligned parallel to the direction 130, the angles 312, 314, and 316 are zero-degree angles in that the light rays 118d, 118d', and 118d" are reflected directly back along the path of the light rays 118c, 118c', and 118c", respectively. Also, in such embodiments, when the light reflecting surfaces that reflect the light rays 118c, 118c', and 118c" as rays 118d, 118d', and 118d" are aligned parallel to the direction 130, the angles from the imaging surface 110 to the rays 118d, 118d', and 118d" are 90-degree angles.

Also, in such embodiments with the beamsplitter having a 45-degree reflective surface and its length being aligned in parallel to the micro-mirror chip and the imaging surface, a light ray of 100% intensity (e.g., light rays 118b, 118b', and 118b") can be split by a beamsplitter (e.g., the beamsplitter 112) to two light rays each of 50% intensity (e.g., the light rays 118c, 118c', and 118c" and 118e, 118e', and 118e"). One of the two split light rays of 50% intensity can reflect from the beamsplitter towards the micro-mirror chip and the other split light ray of 50% intensity passes through the beamsplitter towards the back of the beamsplitter. When the 50% intensity light ray reflects down to the image surface, on its way to the image surface it can split again at the beamsplitter 112 such that a light ray of 25% of the original 100% intensity is received by the imaging surface (e.g., the light ray 118dd, 118dd', and 118dd").

FIG. 4 illustrates some parts of the apparatus 100 illustrated in FIG. 1, and further illustrates mechanisms for displacements (such as displacements 404, 404', and 404") of reflected light rays on the imaging surface 110 of the image sensor 104 of the apparatus 100 to determine the intensity of electromagnetic radiation at corresponding locations of micro mirrors 202 of the micro-mirror chip 102 of the apparatus 100. FIG. 4 also shows the micro-mirror chip 102 in the same level of detail as FIG. 2, and depicts the integration of the micro-mirror chip 102 with the beamsplitter unit 106 and the image sensor 104.

Regarding the mechanisms for displacements, FIG. 4 shows dotted arrows 402, 402', and 402" that represent the positions of the corresponding light rays reflected by respective micro mirrors 202 in initial dotted line positions of the respective micro mirrors 202. After the micro mirrors 202 rotate from the dotted line position to the solid line position (as a consequence of absorbing or sensing sufficient radiation to rotate the mirrors), the light rays of the rotated micro mirrors 202 move from the initial location to a subsequent location as illustrated by the solid arrows 118dd, 118dd', and 118dd".

The measurements of the light ray displacements 404, 404', and 404" can be used to compute an angle of rotation of the corresponding micro mirrors 202. The rotation of a respective one of micro mirrors 202 is proportionately a function of the radiation intensity on the respective one of the radiation absorption surfaces 204 of a respective micro mirror; thus, the measured displacements 404, 404', and 404" can be used to calculate the radiation intensity on the radiation absorption surfaces 204 of the micro mirrors 202.

The measurement of the light ray displacement (e.g., displacements 404, 404', and 404") can be performed for each one of micro mirrors 202 and used to determine the distribution of the radiation intensity on a single micro mirror or on an array of the micro mirrors. The measurement can be performed by a computational unit, which can be mounted on the PCB or can be part of the CMOS image sensor (e.g. an ASIC).

In one embodiment, a photodetector is used to capture the image formed on the imaging surface 110 of the image sensor 104, identify individual light spots derived from corresponding light rays and corresponding to respective micro mirrors 202, determine the locations of the light spots, and compute displacements of the respective light spots corresponding to the displacements of the light rays (such as displacements 404, 404', and 404"); and thus, compute the light intensity associated with the radiation intensity on the micro mirrors 202.

As shown in FIGS. 2 and 4, the y-axis is in the direction of the row of micro mirrors 202 and is parallel to the imaging surface 110 as well as the direction 130 described herein. The light ray displacements 404, 404', and 404", and hence the corresponding light spot displacements on the imaging surface 110, are along the y-axis direction. The mirror plane 200 and the imaging surface 110 are separated by a distance 406 along the z-axis that is perpendicular to the mirror plane 200 and the y-axis direction. As illustrated, the height of the beamsplitter unit 106 can be the distance 406.

The distance 406 along the direction perpendicular of the row of mirrors (i.e., the z-axis) can include the beamsplitter unit 106 (as shown in FIGS. 1-5 and 7-10). Thus, to prevent the beamsplitter unit 106 from interfering with the reflected light from the micro-mirror chip, in some embodiments, the reflected light can travel in a path that avoids the beamsplitter unit 106.

Not shown in the drawings, in some embodiments, light rays can be reflected from one of the plurality of light reflecting surfaces 108 at an angle from the mirror plane 200 in a direction along the x-axis in the x-z plane. The x-z plane is perpendicular to the y-z plane of FIGS. 1-5 and 7-10. Thus, in such embodiments, light rays generally travel along the direction of the row of micro mirrors (such as shown by micro mirrors 202) onto the mirror plane 200 in the y-z plane; and, after being reflected by the micro mirrors, the rays travel along the same direction onto the imaging surface of the image sensor but skewed in the x-z plane or in the direction of the x-axis which goes into or out of the y-z plane of FIGS. 1-5 and 7-10. In one embodiment, there are no structural and/or optical components on the light path between the micro mirrors and the imaging surface. In these ways for example, the reflected light can travel in a path that avoids the beamsplitter unit 106 when traveling towards the imaging surface 110.

As shown in FIG. 4, the imaging surface 110 is in parallel with the mirror plane 200. Thus, when the micro mirrors 202 are in the initial positions that are aligned with the mirror plane 200, the light reflected by different micro mirrors 202 travels equal distances from respective light reflecting areas of the plurality of light reflecting surfaces 108 of the micro mirrors to the imaging surface 110. As a result, equal rotations of the micro mirrors 202, due to equal radiation intensity applied on the radiation absorption surfaces 204 of the micro mirrors 202, result in equal light ray displacement on the imaging surface 110. This arrangement can simplify the calibration for computing the light intensity from the light ray displacement and/or improve accuracy and/or ensure uniform signal generation and uniform sensitivity in the conversion from radiation intensity to light ray displacement.

FIG. 4 illustrates the measuring of displacements (e.g., displacements 404, 404', and 404") of reflected light rays on the imaging surface 110 to determine the intensity of electromagnetic radiation at the location of micro mirrors according to one embodiment.

FIGS. 2 and 4 illustrate a single row of mirrors. However, the micro-mirror chip 102 can have multiple rows of mirrors, which cannot be shown by the two dimensions of FIGS. 1-5 and 7-10.

Not shown in the drawings, in some embodiments, each one of the micro mirrors 202 on its respective light reflecting surface of the plurality of light reflecting surfaces 108 has a light reflecting area and a non-reflective area. The shape and size of the light reflecting area of each micro mirror defines a light spot reflected by the micro mirror on to the imaging surface. In some embodiments, micro mirrors of a chip have the same shape and size in their light reflecting areas. Alternatively, different micro mirrors in a chip can have different shapes and/or sizes in their light reflecting areas, resulting in differently shaped reflected light spots on the imaging surfaces.

The different optical characteristics of the light reflecting areas can be used to improve the accuracy in correlating the light spots on the imaging surface with the corresponding micro mirrors responsible for reflecting the light spots. Different optical characteristics can be achieved by using varying the shape, size, reflection rate, orientation, and/or polarization, etc. of in the reflecting surfaces of the plurality of light reflecting surfaces 108. Further, symbols or graphical patterns can be applied (e.g., etched or overlaid) on the light reflecting areas to mark the micro mirrors such that the micro mirrors responsible for generating the light spots on the imaging surface can be identified from the shape, size, orientation, polarization, intensity and/or markers of the corresponding light spots captured on the imaging surface.

Figure 5:
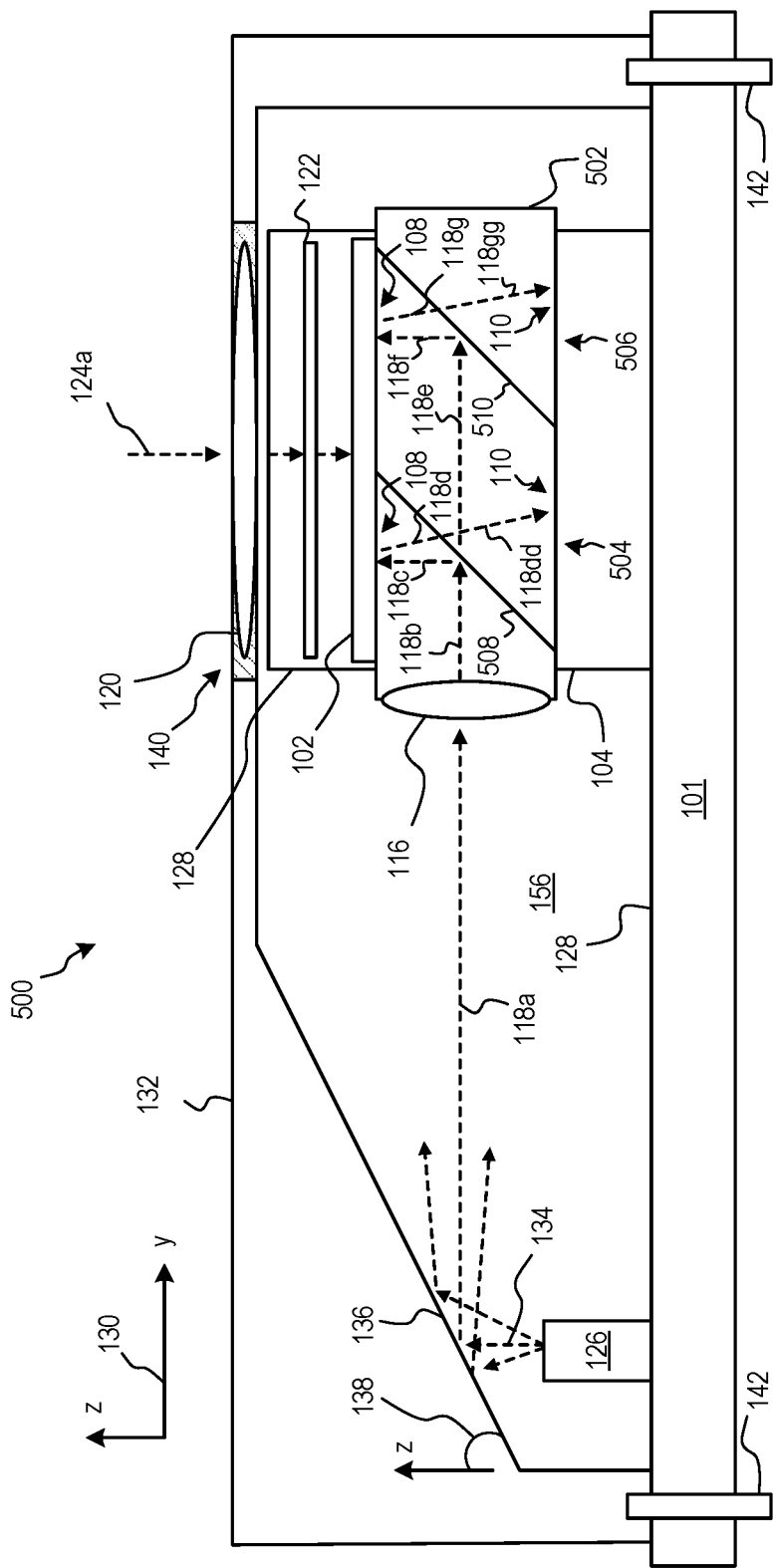
FIG. 5 illustrates another apparatus 500 configured to measure a distribution of electromagnetic radiation according to at least one other embodiment where the light source is part of the printed circuit board and the beamsplitter unit implements sequential beam splitting.

FIG. 5 illustrates another apparatus configured to measure a distribution of electromagnetic radiation according to at least one other embodiment where the light source 126 is part of the PCB 101 and the beamsplitter unit 502 implements sequential beam splitting.

As shown, the apparatus 500 includes or interacts with many elements that are similar to elements of or that interact with the apparatus 100 of FIG. 1. Different from apparatus 100, apparatus 500 includes the beamsplitter unit 502 that implements sequential beam splitting.

The light source 126 emits light rays including light ray 134 upwards in the general direction of the z-axis. To reflect light towards the lens 116 integrated with the beamsplitter unit 502, the enclosure 132 includes the angled reflective surface 136 that is skewed from the z-axis at angle 138. In some embodiments, the angle 138 is 45 degrees so that a center ray, e.g., light ray 134, of the light rays emitted by the light source 126, is reflected at a 90-degree angle towards the lens 116.

The sequential beam spitting is implemented by the two beamsplitters 504 and 506 of the beamsplitter unit 502. The first beamsplitter 504 includes a reflective surface 508 and the second beamsplitter 506 includes a reflective surface 510.

As illustrated in FIG. 5, the collimated light ray 118b splits into two light rays 118c and 118e at the reflective surface 508 of the beamsplitter 504. The light ray 118c is reflected by the beamsplitter 504 towards the plurality of light reflecting surfaces 108 of the micro-mirror chip 102, and the light ray 118*e* transmits through the reflective surface of the beamsplitter 504. The light ray 118*c* is shown reflecting off one of the reflecting surfaces of the plurality of light reflecting surfaces 108 as light ray 118*d*. The light ray 118*d* transmits through the reflective surface of beamsplitter 504 towards the imaging surface of the image sensor 104 as light ray 118*dd*. The light ray 118*e* is transmitted through the beamsplitter 504 to be reflected off the reflective surface 510 of the beamsplitter 506 as light ray 118*f*. The light ray 118*f* is shown as reflected by the beamsplitter 506 towards the plurality of light reflecting surfaces 108 of the micro-mirror chip 102. The light ray 118*f* is shown reflecting off one of the reflecting surfaces of the plurality of light reflecting surfaces 108 as light ray 118*g*. The light ray 118*g* transmits through the reflective surface 510 of beamsplitter 506 towards the imaging surface of the image sensor 104 as light ray 118*gg*.

The additional features of apparatus 500 and some of their alternatives are further described in related application U.S. Prov. App. Ser. No. 62/791,195, filed Jan. 11, 2019, originally titled "SEQUENTIAL BEAM SPLITTING IN A RADIATION SENSING APPARATUS". In the related application originally titled "SEQUENTIAL BEAM SPLITTING IN A RADIATION SENSING APPARATUS", at least some embodiments disclosed relate to electromagnetic radiation detection using sequential beam splitting in general and more particularly but not limited to the sensing of infrared (IR) radiation using sequential beam splitting in a radiation sensing apparatus. The entire disclosure of the related application originally titled "SEQUENTIAL BEAM SPLITTING IN A RADIATION SENSING APPARATUS" is hereby incorporated herein by reference.

Figure 6A:
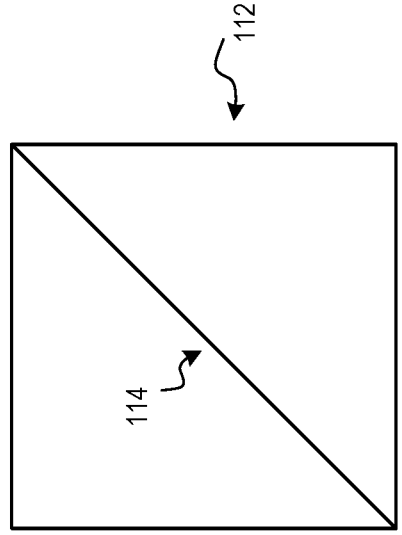
FIGS. 6A, 6B, and 6C illustrate a construction for the structure of the beamsplitter unit according to at least one embodiment such as the embodiment illustrated in FIG. 5 where the beamsplitter unit implements sequential beam splitting.
Figure 6B:
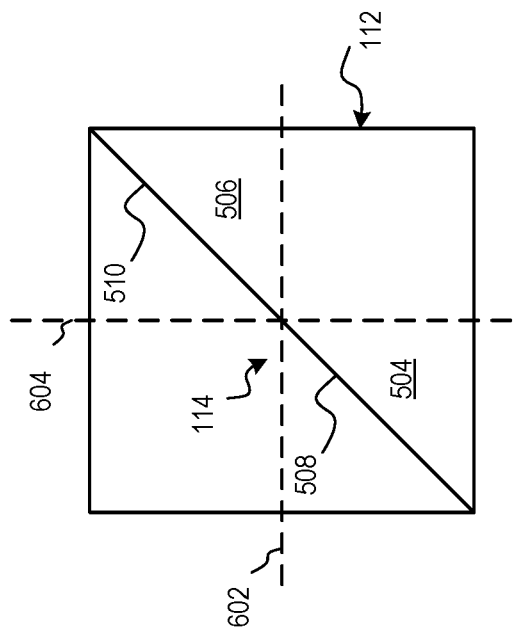
Figure 6C:
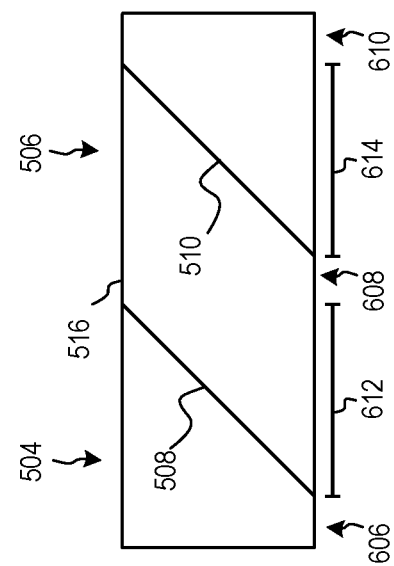

FIGS. 6A, 6B, and 6C illustrate a construction of the structure of the beamsplitter unit according to at least one embodiment where the beamsplitter unit implements sequential beam splitting (such as the beamsplitter unit 502 illustrated in FIG. 5).

A beneficial feature of a beamsplitter unit implementing sequential beam splitting is that its height is reduced so that the apparatus using the beamsplitter unit can have a reduced height as well. This is especially useful for applications with mobile devices or applications where apparatus height may be critical to incorporating apparatus as a component into another apparatus, product or system. The reduced height of the beamsplitter unit implementing sequential beam splitting and the apparatus housing the beamsplitter unit can allow for including the beamsplitter unit and the apparatus in a mobile device. The mobile device can be any electronic device small enough to be held and operated by one or two hands of a person. For instance, the beamsplitter unit implementing sequential beam splitting can have a height of less than 4 millimeters, which allows for use of the beamsplitter unit within many different types of mobile devices.

The beamsplitter unit described implementing sequential beam splitting can be similar to a horizontal arrangement of half-sliced parts of one beamsplitter such as the one beamsplitter illustrated in FIGS. 1-4 and 7-10. To put it another way, a beamsplitter unit implementing sequential beam splitting is similar to a device including half-sliced parts of one beamsplitter that have been rearranged so that the two half-sliced parts are merged sequentially in a horizontal manner.

FIG. 6A illustrates one beamsplitter 112. Beamsplitter 112 of FIG. 6A includes one partially-reflective surface 114 (e.g., one 45-degree reflective surface). FIG. 7B shows slices 602 and 604 of the beamsplitter 112. The slices 602 and 604 divide the beamsplitter 112 in to four parts. Two of the parts can include the beamsplitters 504 and 506. And, as shown in FIGS. 6B and 6C, the beamsplitters 504 and 506 can include the reflective surfaces 508 and 510 of FIG. 5 respectively. FIG. 6C shows the merged beamsplitters 504 and 506, which are merged into structure 516, which is at least a part of beamsplitter unit 502 of FIG. 5. As shown, there is an area 606 in front of the beamsplitter 504, an area 608 between the beamsplitter 504 and the beamsplitter 506, and an area 610 behind the beamsplitter 506. The respective lengths 612 and 614 of each of the beamsplitters 504 and 506 further clarify the boundaries of the areas 606, 608, and 610.

The structure 516 of FIG. 6C can be formed by initially cutting the beamsplitter 112 according to slices 602 and 604 of FIG. 6B, and then attaching the two parts of beamsplitter 112 that have the reflective surfaces 508 and 510. Also, the structure 516 of FIG. 6C can be formed by adding three blocks of transparent materials. The left-side block of the three blocks can include an integrated lens such as a lens similar to lens 116 of FIG. 1. The integrated lens is not shown in FIG. 6C. The three blocks can provide the areas 606, 608, and 610. Along with the left-side block (which can include an integrated lens), a second spacer block can be attached between the beamsplitters 504 and 506, and a third spacer block can be attached to the right of the beamsplitter 506 to derive the structure 516 of FIG. 6C.

It can be beneficial to include the spaces provided by areas 606, 608, and 610 in a beamsplitter unit implementing sequential beam splitting. The spaces are beneficial in that they can minimize the effect inferring light rays that occur from the different light refractions that occur in the beamsplitter implementing sequential beam splitting. Such inferring light rays interfere with the light rays used to detect radiation when there is not sufficient space between the reflecting surfaces of the beamsplitters 504 and 506. Thus, the areas 606, 608, and 610 can provide the sufficient space to reduce interference.

Another way to reduce interference is to increase the length of each beamsplitter of a beamsplitter unit implementing sequential beam splitting. Since it is desirable to include the disclosed apparatuses in mobile devices, increasing the height of beamsplitters to reduce interference is not a practical option considering that many mobile devices have a thin form. To reduce interference for apparatuses to be used within mobile devices, in some embodiments, the distance between the micro-mirror chip and the imaging sensor is equal to or less than either of the lengths of the imaging sensor and the micro-mirror chip. For example, the distance between the micro-mirror chip and the imaging sensor is half or less than half of the length of the imaging sensor. Also, the distance between the micro-mirror chip and the imaging sensor can be half or less than half of the length of the micro-mirror chip.

In some embodiments, the length of each beamsplitter of a beamsplitter unit implementing sequential beam splitting (such as each respective length 612 and 614 of beamsplitters 504 and 506) is at most half of the length of the imaging sensor or the micro-mirror chip used with the beamsplitter unit. In some embodiments including such embodiments where the length of each beamsplitter of the beamsplitter unit is at most half of the length of the imaging sensor or the micro-mirror chip used with the beamsplitter unit, the micro-mirror chip and the image sensor can be the same length.

Also, the length of a beamsplitter unit can be greater than, less than, or equal to the lengths of the imaging sensor and the micro-mirror chip. For example, the length of the image sensor and the total length of the beamsplitter unit can be the same or the beamsplitter unit can have a greater or lesser length than the image sensor. Also, the length of the micro-mirror chip and the total length of the beamsplitter unit can be the same or the beamsplitter unit can have a greater or lesser length than the micro-mirror chip. Such variations can occur with beamsplitter units that are implementing sequential beam splitting or not.

FIG. 7 illustrates another apparatus 702 configured to measure a distribution of electromagnetic radiation according to at least one other embodiment where a signal processing unit 702 is connected to the image sensor 104 via the PCB 101.

As shown, the apparatus 700 includes or interacts with many elements that are similar to elements of or that interact with the apparatus 100 of FIG. 1. Different from apparatus 100, apparatus 700 includes the signal processing unit 702. Alternatively, a signal processing unit can be indirectly connected to the image sensor 104, such as a remote signal processing unit connected to the image sensor through a computer network. In other embodiments, a signal processing unit can be directly connected to the PCB 101, and in such examples a coupling on the PCB 101 can connect the image sensor 104 and the signal processing unit (as illustrated in FIG. 7).

In some embodiments, a signal transmitting unit is coupled with the signal processing unit 702 or its alternative to transmit the image data captured by the image sensor 104 and/or the measuring data processed by the signal processing unit 702 or its alternative. The image data captured by the image sensor 104 and/or the measuring data processed by the signal processing unit 702 or its alternative indicate the light ray displacements (such as displacements 404, 404', and 404"), the micro mirror rotations, and the intensity of the radiation (such as the intensity of radiation rays 124c).

The signal processing unit 702 can be programmed for customized processing of designated applications. The signal processing unit 702 can process the reflected light ray displacements (such as displacements 404, 404', and 404") and generate corresponding electrical signal gains. The signal can be further processed and for example displayed to the end user via an external display. In one example, signals processed by the signal processing unit 702 are transmitted through a communication port wirelessly to a portable device, where the end user can see the generated signals and has the ability to control or interact through a user interface with the apparatus 700 or the signal processing unit 702. The signals can be transmitted and exchanged through any wired or wireless transmission method, using e.g. a USB, Bluetooth, Wi-Fi, etc. The end user's display and interface can include any device, for example a smartphone, tablet, laptop computer, etc.

In some embodiments, the PCB can contain further surface mounted electronic components of any kind on its front and/or backside, in addition to the signal processing unit. In some examples, the electronic components and/or the signal processing unit can be covered by a cap, or embedded in epoxy or covered and/or embedded with some material which can reduce the scatter of the off-cone light rays. In some embodiments, the PCB can have electronic contact pads on its frontside and/or backside for factory calibration or operation.

Further, the backside 149 of the PCB 101 can be flat, without the pins 142 to stick out of this surface. This flat surface can be used to mount the apparatus on another flat surface on for example a host board. In some examples, an adhesive may be used with the flat surface before it is mounted and/or fixed to a host board as a way of attaching and/or fixing this apparatus to another apparatus. In some examples, a connection cable may be attached to the PCB and be protruding from the apparatus so it provides a way to connect electronically the apparatus to another device. The connection cable can supply operating power and exchange data and signals between the apparatus (e.g., apparatus 100 or 700) and the host processor and/or device. In some examples, the connector can stream the thermal image, or the CMOS image.

FIG. 8 illustrates another apparatus 800 configured to measure a distribution of electromagnetic radiation according to at least one other embodiment where the radiation lens 120 and a radiation filter 122 are within a wall 842 (such as a cylindrical wall) of an opening 840 of the enclosure 832 that is above the micro-mirror chip 102 and housing 828 of the micro-mirror chip. As shown, the apparatus 800 includes or interacts with many elements that are similar to elements of or that interact with the apparatus 100 of FIG. 1. Different from apparatus 100, apparatus 800 includes an upper exterior surface 850 that includes the opening 840 that houses the lens 120 and the filter 122. The opening traverses a top wall of the enclosure 832 from the exterior surface 850 to the interior surface 846. The housing 828 is within the chamber 156 and separated by space within the chamber from the opening 840. This configuration can be beneficial in that the lens 120 and the filter 122 can be separated from the housing that contains the micro-mirror chip.

FIG. 9 illustrates another apparatus 900 configured to measure a distribution of electromagnetic radiation according to at least one other embodiment where the radiation lens 120 and a radiation filter 122 are within a wall 942 (such as a cylindrical wall) of an opening 940 of the enclosure 932. Different from apparatus 800, apparatus 900 is configured such that the micro-mirror chip 102 resides below the filter 122 within the wall 942 of the opening 940. As shown, the apparatus 900 includes or interacts with many elements that are similar to elements of or that interact with the apparatus 100 of FIG. 1. Different from apparatus 100, apparatus 900 includes an upper exterior surface 950 that includes the opening 940 that houses the lens 120, the filter 122 and the micro-mirror chip 102. The opening 940 traverses a top wall of the enclosure 932 from the exterior surface 950 to the interior surface 946. There is no housing for the micro-mirror chip and no space within the chamber 156 that separates the chip from the filter 122 since both elements are contained within the opening 940. This configuration can be beneficial in that an additional housing for the micro-mirror chip 102 is not used. Also, for example, the wall 942 can facilitate directing and focusing radiation onto the micro-mirror chip 102. Also, the micro-mirror chip 102 is shown directly attached to the beamsplitter unit 106. Further, such an arrangement where the enclosure 932 is in direct contact with the beamsplitter unit 106 can be used to align the enclosure relative to the beamsplitter unit, or vice versa.

FIG. 10 illustrates another apparatus 1000 configured to measure a distribution of electromagnetic radiation according to at least one other embodiment where the radiation lens 120 and a radiation filter 122 are within a wall 1042 (such as a cylindrical wall) of an opening 1040 of the enclosure 1032. Different from apparatus 800, apparatus 1000 is configured such that the micro-mirror chip 102 resides below the filter 122 within the wall 1042 of the opening 1040 partially. As shown, the apparatus 1000 includes or interacts with many elements that are similar to elements of or that interact with the apparatus 100 of FIG. 1. Different from apparatus 100, apparatus 1000 includes an upper exterior surface 1050 that includes the opening 1040 that houses the lens 120 and the filter 122 as well as partially houses the micro-mirror chip 102. The opening 1040 traverses a top wall of the enclosure 1032 from the exterior surface 1050 to the interior surface 1046. There is no housing for the micro-mirror chip and no space within the chamber 156 that separates the chip from the filter 122. This configuration can be beneficial in that an additional housing for the micro-mirror chip 102 is not used. Also, for example, the wall 1042 can sufficiently facilitate directing and focusing radiation onto the micro-mirror chip 102. Also, the micro-mirror chip 102 is shown directly attached to the beamsplitter unit 106, so that it is not necessarily beneficial to have the entire chip within the wall 1042. Another example, benefit of the configuration of apparatus 1032 is that the chamber 156 is more flexible for different sized beamsplitter units. Since the height of chamber 156 of apparatus 1032 is greater than the height of chamber 156 of apparatus 932.

In some embodiments, a micro-mirror chip does not have a housing and it is glued directly on the beamsplitter unit. The beamsplitter unit can be aligned on a PCB through pins or can be aligned on a CMOS by a recess. The radiation filter 122 is optional and can be left out in some embodiments. A single element lens is sufficient, which can be glued inside the housing and which provides light and/or hermetic isolation.

In some examples, the light directing device can be a prism or have a different shape than presented in the drawings, also the surface 114 can be a small airgap or consist of different material. Surface 136 can be partially patterned reflective surface to block stray light.

Also, described herein is a printed circuit board arrangement with a flexible part for an electromagnetic radiation detector. In some embodiments, the electromagnetic radiation sensing using beam splitting in a radiation sensing apparatus includes the light source mounted on a flexible part (e.g., see the flexible part 1202 depicted in FIG. 12). In other words, variations of the apparatuses described herein can include a light source mounted to a flexible part (e.g., see the flexible part 1202 depicted in FIG. 12). In some embodiments, a light source, such as a light-emitting diode (LED), is attached to a flexible part of the radiation sensing apparatus or a flexible part of the PCB (printed circuit board) in which the apparatus is attached (e.g., see the flexible part 1202 depicted in FIG. 12). By bending the flexible part, a beam emitted from the light source can be directed towards a beamsplitter (e.g., see FIG. 12).

With using the flexible part, the light ray from the light source (such as from an LED) can hit the beamsplitter perpendicularly. Also, the light source can be fixed to the PCB. In some embodiments, the light source can be fixed to a flexible part of the PCB or a flexible part of the apparatus that is attached to the PCB. Also, in some embodiments (not depicted), the apparatus can include a reflective wall (e.g., reflective surface 136 depicted in at least FIG. 1) and a flexible part (e.g., see the flexible part 1202 depicted in FIG. 12), such that the flexible part is flexed so that a beam is emitted towards the reflective surface from a light source mounted to the flexible part, and then reflected towards the beamsplitter from the reflective surface.

In some embodiments, the light source is attached to a flexible part of the PCB and the flexible part is bent upwards. In such example, the flexible part can be attached on a vertical side (front) wall of the housing of the apparatus. The wall can have a small opening (such as a pinhole) for the light source to emit beams through the opening.

Figure 12:
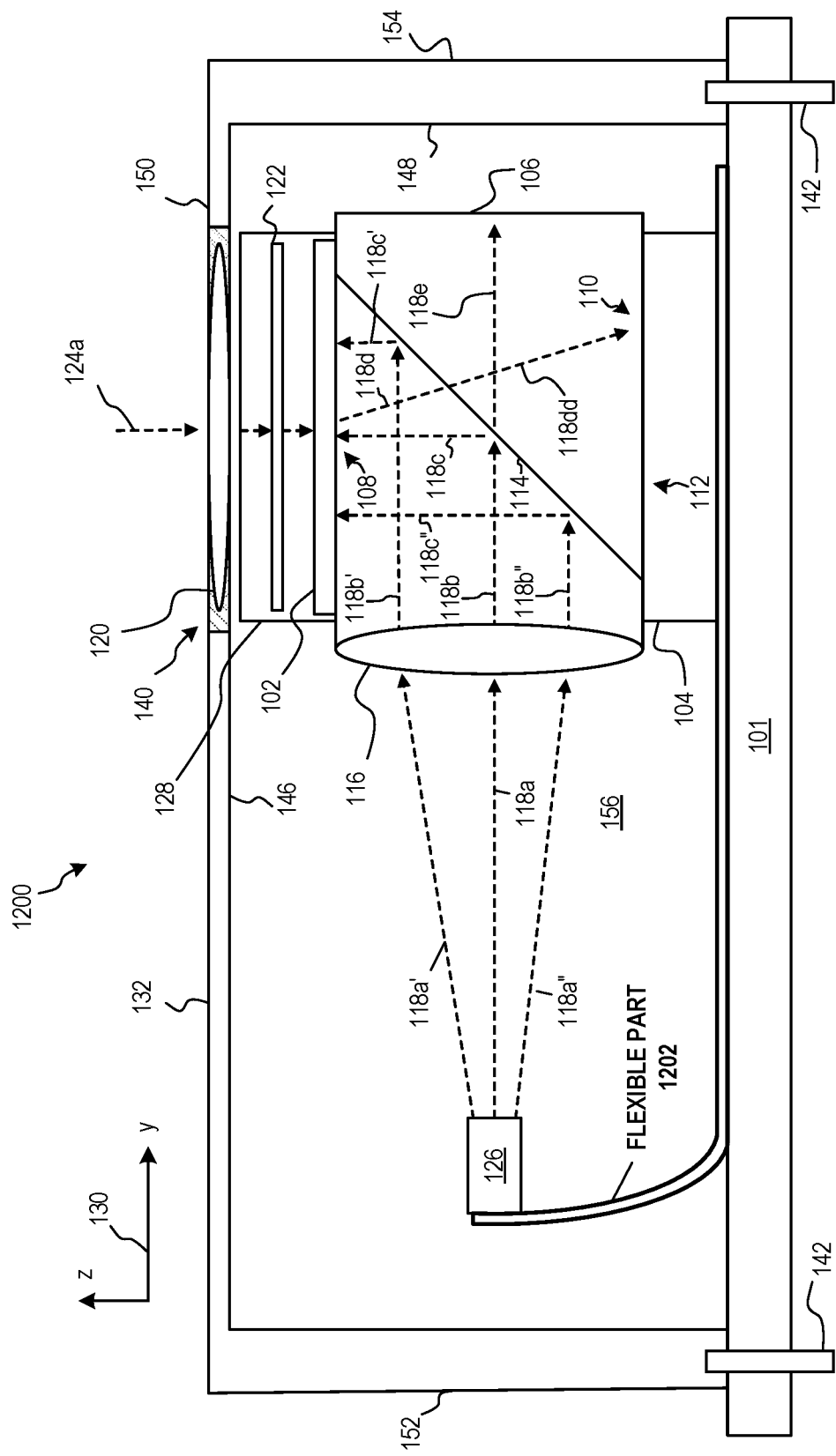
FIG. 12 illustrates another apparatus 1200 configured to measure a distribution of electromagnetic radiation according to at least one other embodiment where the apparatus includes a light source mounted on a flexible part.

In some embodiments, the flexible part (flex PCB) is part of the PCB. A stiffener and a low-profile board-to-board connector can connect the flex PCB to a main PCB in the assembly. Also, a lens and the outer walls of the apparatus can include a molded plastic shell glued on the PCB. The lens can be the lens 120 as shown in FIG. 12.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. An apparatus comprising:
   a beamsplitter; and
   a reflector, wherein:
   the beamsplitter and the reflector are configured to be positioned along an axis parallel to a surface of a micro-mirror chip situated proximate to the apparatus;
   the beamsplitter comprises a partially-reflective surface that is oblique to the axis, the partially-reflective surface configured to split a first light ray from a light source into a second light ray and a third light ray;
   the beamsplitter is configured to direct the second light ray toward a first portion of the micro-mirror chip and direct the third light ray toward the reflector; and
   the reflector comprises a surface that is at least partially reflective and is oblique to the axis, the surface configured to reflect at least a portion of the third light ray toward a second portion of the micro-mirror chip.

2. The apparatus of claim 1, wherein the beamsplitter is a first beamsplitter, and wherein the reflector comprises a second beamsplitter, such that the surface of the reflector splits the third light ray into a fourth light ray and a fifth light ray.

3. The apparatus of claim 2, wherein the fourth light ray is reflected toward the second portion of the micro-mirror chip.

4. The apparatus of claim 2, wherein the fifth light ray passes through the surface.

5. The apparatus of claim 4, wherein the fifth light ray passes through the surface toward a housing of the apparatus.

6. The apparatus of claim 1, wherein the micro-mirror chip comprises a plurality of light reflecting surfaces.

7. The apparatus of claim 6, wherein the micro-mirror chip is configured to reflect light toward an image sensor comprising an imaging surface.

8. The apparatus of claim 7, wherein the light reflected toward the image sensor passes through the apparatus.

9. The apparatus of claim 1, wherein the partially-reflective surface is oriented at approximately a 45-degree angle with respect to the axis.

10. The apparatus of claim 1, wherein the surface of the reflector is oriented at approximately a 45-degree angle with respect to the axis.

11. The apparatus of claim 1, further comprising a lens through which the first light ray passes between the light source and the beamsplitter.

12. The apparatus of claim 1, wherein the partially-reflective surface extends through a first length of the beamsplitter and the surface of the reflector extends through a second length of the beamsplitter.

13. The apparatus of claim 12, wherein the beamsplitter comprises an area between the first length of the partially-reflective surface and the second length of the reflector in which there is no reflective surface.

14. The apparatus of claim 12, wherein the beamsplitter comprises an area between where the first light ray enters the beamsplitter and the first length of the partially-reflective surface in which there is no reflective surface.

15. The apparatus of claim 12, wherein the beamsplitter comprises an area between the second length of the reflector and a rear surface of the beamsplitter in which there is no reflective surface.

16. The apparatus of claim 1, wherein the wherein the apparatus is less than 4 millimeters in height.

17. An apparatus comprising:
a micro-mirror chip comprising a plurality of light reflecting surfaces;
an image sensor comprising an imaging surface; and
a beamsplitter unit located between the micro-mirror chip and the image sensor, wherein the beamsplitter unit comprises a beamsplitter and a reflector, and further wherein:
the beamsplitter and the reflector are positioned along an axis parallel to a surface of the micro-mirror chip proximate to the beamsplitter unit;
the beamsplitter comprises a partially-reflective surface that is oblique to the axis, the partially-reflective surface configured to split a first light ray from a light source into a second light ray and a third light ray;
the beamsplitter is configured to direct the second light ray toward a first portion of the micro-mirror chip and direct the third light ray toward the reflector; and
the reflector comprises a surface that is at least partially reflective and is oblique to the axis, the surface configured to reflect at least a portion of the third light ray toward a second portion of the micro-mirror chip.

18. The apparatus of claim 17, wherein the first portion of the micro-mirror chip is a first half of the micro-mirror chip and the second portion of the micro-mirror chip is a second half of the micro-mirror chip.

19. The apparatus of claim 17, wherein:
the beamsplitter unit comprises a first area between the first length of the partially-reflective surface and the second length of the reflector in which there is no reflective surface;
the beamsplitter unit comprises a second area between where the first light ray enters the beamsplitter and the first length of the partially-reflective surface in which there is no reflective surface; and
the beamsplitter unit comprises a third area between the second length of the reflector and a rear surface of the beamsplitter in which there is no reflective surface.

20. An apparatus comprising:
a first beamsplitter; and
a second beamsplitter, wherein:
the first beamsplitter and the second beamsplitter are configured to be positioned along an axis parallel to a surface of a micro-mirror chip positioned adjacent to the apparatus;
the first beamsplitter comprises a first partially-reflective surface that is oblique to the axis, the first partially-reflective surface configured to split a first light ray from a light source into a second light ray and a third light ray;
the first beamsplitter is configured to direct the second light ray toward a first portion of the micro-mirror chip and direct the third light ray toward the second beamsplitter; and
the second beamsplitter comprises a second partially-reflective surface that is oblique to the axis, the second partially-reflective surface configured to reflect at least a portion of the third light ray toward a second portion of the micro-mirror chip.

* * * * *